United States Patent
Enomoto

(10) Patent No.: US 12,105,777 B2
(45) Date of Patent: Oct. 1, 2024

(54) AUTHENTICATION SYSTEM AND AUTHENTICATION APPARATUS FOR AUTHENTICATING AUTHENTICATION-TARGET APPARATUS

(71) Applicant: CANON KABUSHIKI KAISHA, Tokyo (JP)

(72) Inventor: Hisashi Enomoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/340,683

(22) Filed: Jun. 23, 2023

(65) Prior Publication Data
US 2023/0334129 A1 Oct. 19, 2023

Related U.S. Application Data

(62) Division of application No. 17/217,970, filed on Mar. 30, 2021, now Pat. No. 11,727,095.

(30) Foreign Application Priority Data

Apr. 2, 2020 (JP) ................................. 2020-066953

(51) Int. Cl.
*G06F 21/31* (2013.01)
*H04L 9/32* (2006.01)

(52) U.S. Cl.
CPC ............ *G06F 21/31* (2013.01); *H04L 9/3236* (2013.01); *H04L 9/3271* (2013.01)

(58) Field of Classification Search
None
See application file for complete search history.

(56) References Cited

U.S. PATENT DOCUMENTS

| | | | |
|---|---|---|---|
| 2007/0204078 A1* | 8/2007 | Boccon-Gibod | G06F 21/64 710/54 |
| 2016/0364555 A1* | 12/2016 | Child | H04L 63/0846 |
| 2021/0028923 A1* | 1/2021 | Ryou | H04L 9/3239 |
| 2021/0321223 A1* | 10/2021 | Adachi | H04W 4/023 |

* cited by examiner

*Primary Examiner* — James R Turchen
(74) *Attorney, Agent, or Firm* — Canon U.S.A., Inc. IP Division

(57) ABSTRACT

An authentication apparatus transmits code and challenge to a target, receives a response, and authenticates the target based on the response. The target receives the code and the challenge, generates a password for comparison by executing n times of repetitive computation by a recurrence relation or a recursive function using the code as an initial input, executes password authentication using a pre-stored password and the password for comparison. If the password authentication has succeeded, the target reads out an authentication seed corresponding to the number n that is the number of times of execution of the repetitive computation with which the password for comparison that matches a password has been obtained, and generates the response using the read-out authentication seed and the challenge received from the authentication apparatus, and transmits the response.

13 Claims, 16 Drawing Sheets

F I G. 3A

| PASSWORD | AUTHENTICATION DATA | IDENTIFICATION INFORMATION | OTHER INFORMATION |
|---|---|---|---|
| ChipPWD | ChipSeed1 | ID | OWF |
| | ChipSeed2 | | |
| | ChipSeed3 | | |

F I G. 3B

| PASSWORD | AUTHENTICATION DATA | FLAG | OTHER INFORMATION |
|---|---|---|---|
| MasterPWD | MasterSeed1 | FLG | OWF |
| | MasterSeed2 | | |
| | MasterSeed3 | | |

FIG. 9

| NUMBER OF TIMES OF EXECUTION n | CHIP SEED | PASSCODE | FLAG FLG |
|---|---|---|---|
| 1 | ChipSeed1 | PASSCODE 3 | 0 |
| 2 | ChipSeed2 | PASSCODE 2 | 1 |
| 3 | ChipSeed3 | PASSCODE 1 | 2 |

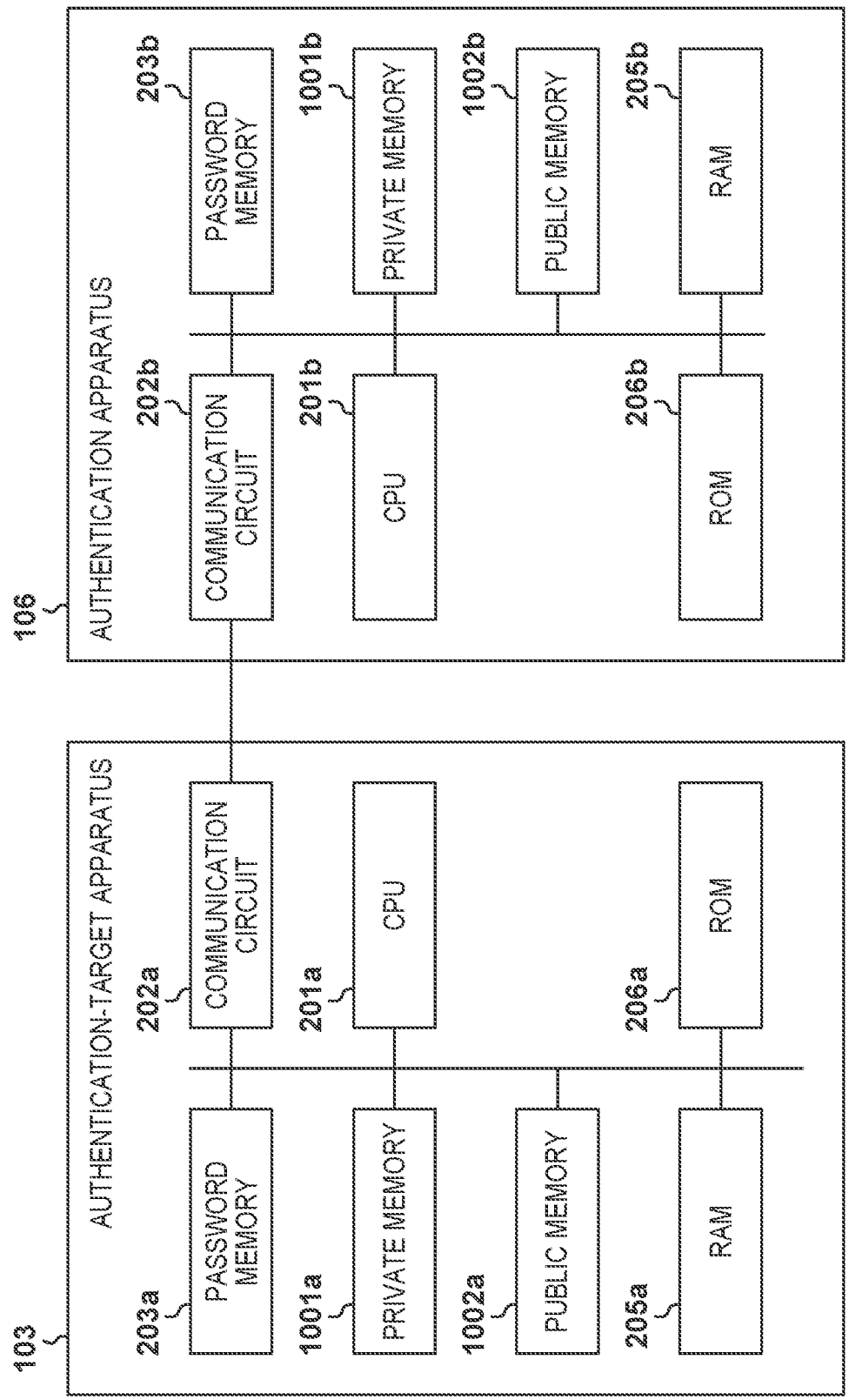

FIG. 11A

| AUTHENTICATION-TARGET KEY | Bk10 | Bk11 | Bk12 |
|---|---|---|---|
| PASSWORD | ChipPWD | | |

FIG. 11B

| KEY ID | ID10 | ID11 | ID12 |
|---|---|---|---|
| IDENTIFICATION INFORMATION | CRGID | | |

FIG. 11C

| AUTHENTICATION KEY | Mk10 | Mk11 | Mk12 |
|---|---|---|---|
| PASSWORD | MasterPWD | | |

FIG. 11D

| KEY ID | ID10 | ID11 | ID12 |
|---|---|---|---|

AUTHENTICATION SYSTEM AND AUTHENTICATION APPARATUS FOR AUTHENTICATING AUTHENTICATION-TARGET APPARATUS

CROSS-REFERENCE TO RELATED APPLICATION

This application is a Divisional of U.S. application Ser. No. 17/217,970, filed Mar. 30, 2021, which claims priority from Japanese Patent Application No. 2020-066953 filed Apr. 2, 2020, which are hereby incorporated by reference herein in their entireties.

BACKGROUND

Field

The present disclosure relates to an authentication system for authenticating an authentication-target apparatus by an authentication apparatus.

Description of the Related Art

When a part that is not considered in designing an electronic device such as an image forming apparatus is connected to the electronic device, the electronic device may fail, or an unexpected event may occur. Japanese Patent Laid-Open No. 2003-162986 describes a technique by which identification information (an ID) can be authenticated in order to identify whether a battery pack is a genuine product or not.

Relatedly, the security of an authentication system can be improved if a challenge and response authentication is executed after password authentication using a password has succeeded. In such an authentication system, when the number of pieces of data regarding which password authentication is used to limit access to the data, increases, the number of passwords can also increase. Therefore, a memory having a large storage capacity can become necessary.

SUMMARY

Various embodiments of the present disclosure provide an authentication system including an authentication apparatus and an authentication-target apparatus. The authentication apparatus includes: a first transmission unit configured to transmit code data and challenge data to the authentication-target apparatus; a first reception unit configured to receive a response corresponding to the challenge data from the authentication-target apparatus; and an authentication unit configured to authenticate the authentication-target apparatus based on the response. The authentication-target apparatus includes: a second reception unit configured to receive the code data and the challenge data from the authentication apparatus; a first generation unit configured to generate a password for comparison by executing n times of repetitive computation by a recurrence relation or a recursive function using the code data as an initial input; a storage unit configured to store a password assigned to the authentication-target apparatus and a plurality of authentication seeds; a password authentication unit configured to execute password authentication using a password stored in the storage unit and the password for comparison; a second generation unit configured to, if the password authentication has succeeded, read out, from the storage unit, an authentication seed corresponding to the number n that is the number of times of execution of the repetitive computation with which the password for comparison that matches a password stored in the storage unit has been obtained, and generate the response using the read-out authentication seed and the challenge data received from the authentication apparatus; and a second transmission unit configured to transmit the response to the authentication apparatus.

Further features of various embodiments of the present disclosure will become apparent from the following description of exemplary embodiments (with reference to the attached drawings).

BRIEF DESCRIPTION OF THE DRAWINGS

FIG. 3A is a diagram for describing storage contents according to one embodiment.

FIG. 3B is a diagram for describing storage contents according to one embodiment.

FIG. 9 is a diagram for describing a relationship between the number of times of execution and a chip seed according to one embodiment.

FIG. 10 is diagram for describing an authentication apparatus and an authentication-target apparatus according to one embodiment.

FIG. 11A is diagram for describing storage contents according to one embodiment.

FIG. 11B is diagram for describing storage contents according to one embodiment.

FIG. 11C is diagram for describing storage contents according to one embodiment.

FIG. 11D is diagram for describing storage contents according to one embodiment.

DESCRIPTION OF THE EMBODIMENTS

Figure 1A:
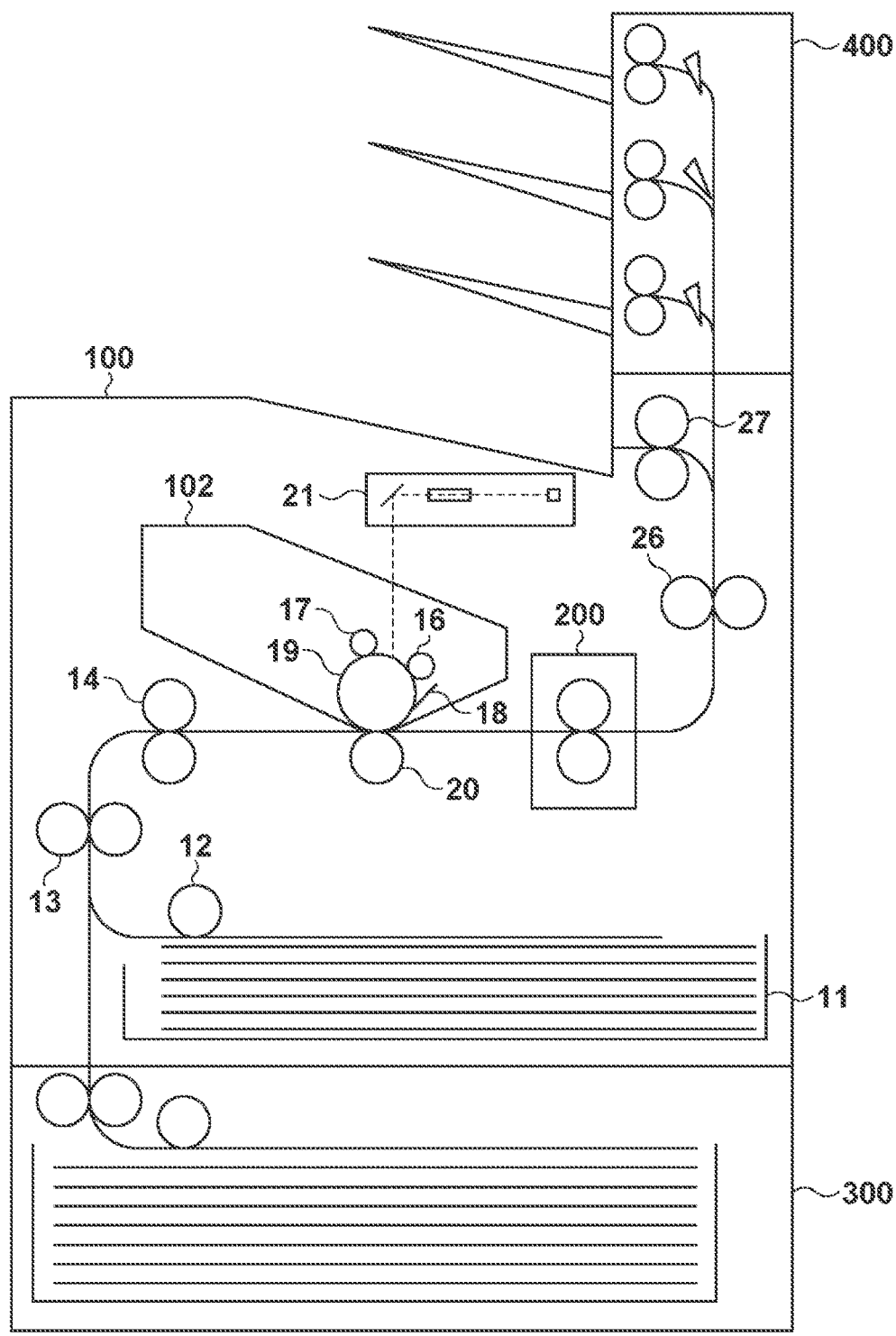
FIG. 1A is a diagram for describing an image forming apparatus according to one embodiment.

Hereinafter, various embodiments will be described in detail with reference to the attached drawings. Note, the following embodiments are not intended to limit the scope of the claimed invention. Multiple features are described in the described embodiments, but limitation is not made to an invention that requires all such features, and multiple such features may be combined as appropriate. Furthermore, in the attached drawings, the same reference numerals are given to the same or similar configurations in different figures, and redundant description thereof is omitted.

Embodiment 1

[Image Forming Apparatus (Authentication System)]

FIG. 1A shows a schematic configuration of an image forming apparatus 100, an optional sheet feeding apparatus 300, and an optional sheet discharge apparatus 400. The image forming apparatus 100 is a printer, copier, multi-function peripheral, or the like that forms an image on a sheet in accordance with the electrophotographic process. A charging roller 16 uniformly charges the surface of a photosensitive drum 19. An exposure unit 21 forms an electrostatic latent image by emitting light to the photosensitive drum 19. A developing roller 17 forms a toner image by developing the electrostatic latent image with toner. A sheet feeding unit 12 supplies sheets that are loaded or contained in a sheet loading unit 11. Conveyance rollers 13 and 14 convey the sheets to an image forming unit. The image forming unit includes a transfer nip unit formed by a transfer roller 20 and the photosensitive drum 19. The transfer nip unit transfers the toner image from the photosensitive drum 19 to a sheet. A fixing device 200 fixes the toner image to the sheet. A conveyance roller 26 and a discharging roller 27 discharges the sheet to the outside of the image forming apparatus 100. A cleaner 18 cleans the photosensitive drum 19.

A process cartridge 102 is configured by integrating the photosensitive drum 19, the charging roller 16, the developing roller 17, and the cleaner 18. The process cartridge 102 is a replacement part that can be attached to and detached from the image forming apparatus 100. Also, the fixing device 200 is a replacement part that can be attached to and detached from the image forming apparatus 100.

An optional sheet feeding apparatus 300 is an apparatus that is provided to increase the sheet load amount, and can be attached to and detached from the image forming apparatus 100. An optional sheet discharge apparatus 400 is an apparatus for discharging a sheet on which an image has been formed while selecting one of the trays and can be attached to and detached from the image forming apparatus.

Figure 1B:
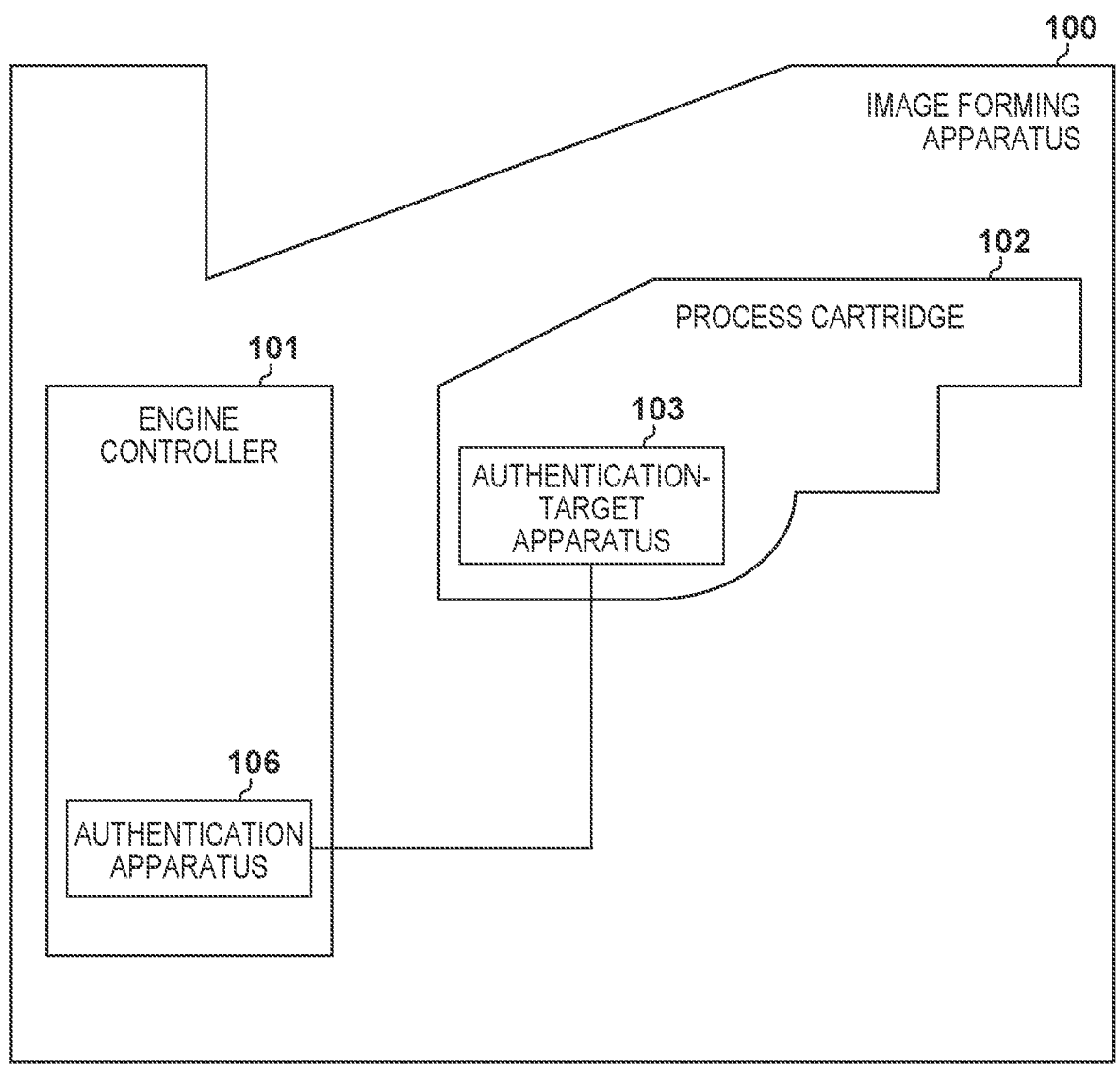
FIG. 1B is a diagram for describing an authentication system according to one embodiment.

FIG. 1B shows an image forming system on which an authentication system is mounted. An engine controller 101 includes an authentication apparatus 106. That is, the authentication apparatus 106 is provided in a main body of the image forming apparatus 100. The authentication apparatus 106 is a semiconductor integrated circuit for authenticating an authentication-target apparatus 103. The authentication apparatus 106 may also be called as an authentication IC. The process cartridge 102 includes the authentication-target apparatus 103. The authentication-target apparatus 103 may be mounted on a replacement part or a consumable of the image forming apparatus 100. The replacement part is not limited to the process cartridge 102, and a development cartridge and a toner cartridge may also be adopted as replacement parts. The development cartridge is a cartridge configured only by a development apparatus including the developing roller 17, and is a replacement part that can be attached to and detached from the image forming apparatus 100. The toner cartridge is a replacement part to or from which only a toner container (not illustrated) containing toner can be attached or detached.

The authentication-target apparatus 103 may be a tamper resistant chip. The authentication-target apparatus 103 may be incorporated in a consumable, a replacement part (fixing device 200), or an optional device (optional sheet feeding apparatus 300, optional sheet discharge apparatus 400, or the like) of the image forming apparatus 100.

[Authentication Apparatus and Authentication-Target Apparatus]

Figure 2:
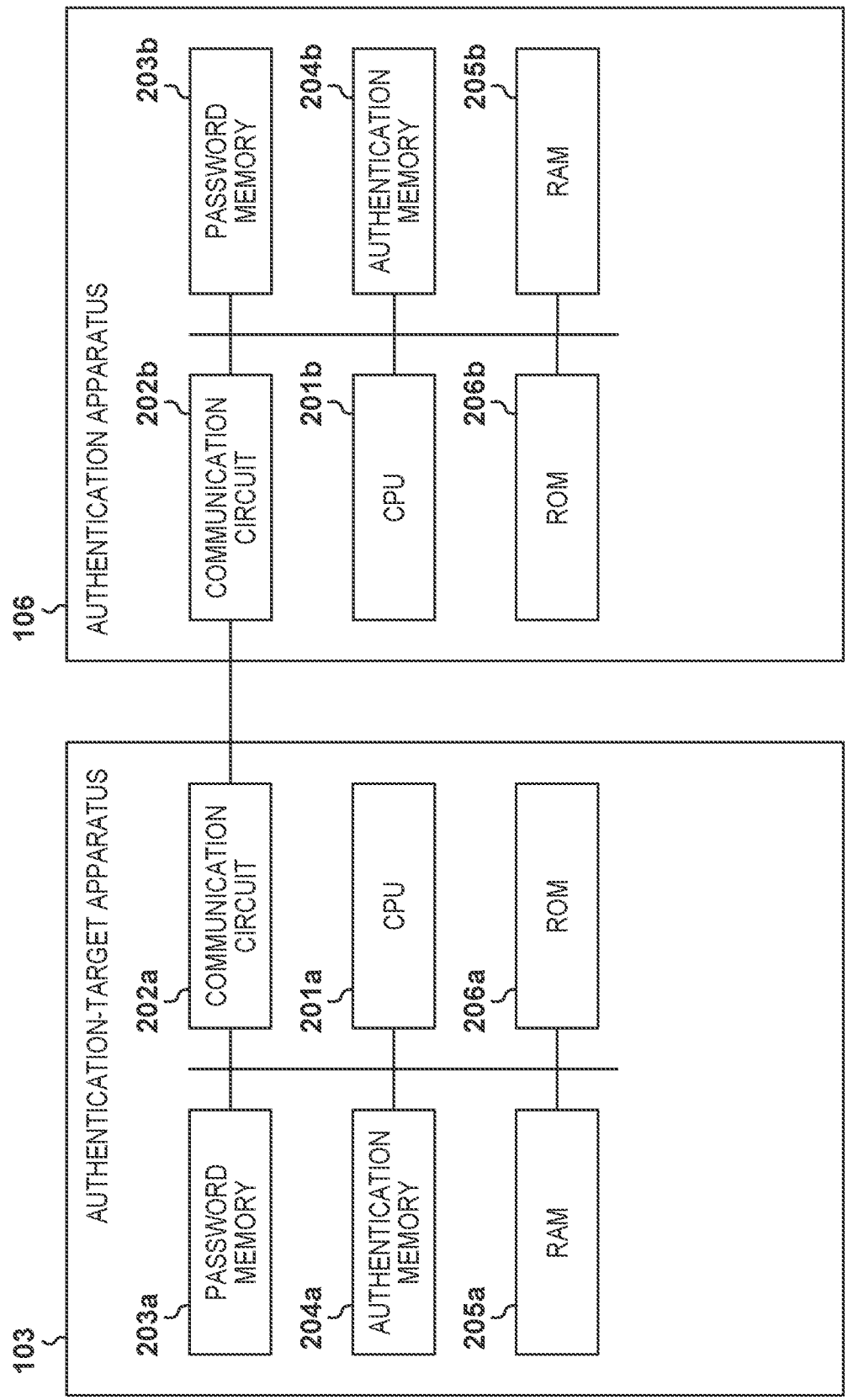
FIG. 2 is a diagram for describing an authentication apparatus and an authentication-target apparatus according to one embodiment.

FIG. 2 shows an internal configuration of the authentication apparatus 106 and the authentication-target apparatus 103. The authentication-target apparatus 103 includes a CPU 201a, a communication circuit 202a, a password memory 203a, an authentication memory 204a, a RAM 205a, and a ROM 206a. The CPU 201a controls the authentication-target apparatus 103 in accordance with a control program stored in the ROM 206a. The communication circuit 202a includes a receiving circuit (input circuit) for receiving information from the authentication apparatus 106 and a transmitting circuit (output circuit) for transmitting information to the authentication apparatus 106. As shown in FIG. 3A, the password memory 203a stores a password ChipPWD. The password ChipPWD is a private password that is not open to the outside. The authentication memory 204a stores a plurality of pieces of authentication data (e.g.: seeds ChipSeed1 to 3) to be used after the password authentication has succeeded. The seeds ChipSeed1 to 3 are also private data that is not open to the outside. The RAM 205a temporarily stores data received from the authentication apparatus 106, data obtained by calculation performed in password authentication, data obtained by calculation performed in apparatus authentication using a seed, and the like. The ROM 206a stores identification information ID assigned to the authentication-target apparatus 103, a one-way function to be used in the password authentication, a one-way function to be used in the apparatus authentication, and the like.

The authentication apparatus 106 includes a CPU 201b, a communication circuit 202b, a password memory 203b, an authentication memory 204b, a RAM 205b, and a ROM 206b. The CPU 201b controls the authentication apparatus 106 in accordance with a control program stored in the ROM 206b. The communication circuit 202b includes a receiving circuit (input circuit) for receiving information from the authentication-target apparatus 103 and a transmitting circuit (output circuit) for transmitting information to the authentication-target apparatus 103. As shown in FIG. 3B, the password memory 203b stores a password MasterPWD. The password MasterPWD is a private password that is not open to the outside. The authentication memory 204b stores a plurality of pieces of authentication data (e.g.: seeds MasterSeed1 to 3) to be used in verification of a response received from the authentication-target apparatus 103 after the password authentication has succeeded. The seeds MasterSeed1 to 3 are also private data that is not open to the outside. The RAM 205b temporarily stores data received from the authentication-target apparatus 103, challenge data (hereinafter, referred to as a "challenge"), data obtained by calculation performed in password authentication, data obtained by calculation performed in apparatus authentication using a seed, and the like. The ROM 206b stores a flag FLG for managing the number of times of execution of the authentication processing, a one-way function to be used in the password authentication, a one-way function to be used in the apparatus authentication, and the like.

MasterSeed1 of the authentication apparatus 106 is associated with ChipSeed1 of the authentication-target apparatus 103 using a predetermined one-way function and the identification information ID. MasterSeed2 of the authentication apparatus 106 is associated with ChipSeed2 of the authentication-target apparatus 103 using the predetermined one-way function and the identification information ID. MasterSeed3 of the authentication apparatus 106 is associated with ChipSeed3 of the authentication-target apparatus 103 using the predetermined one-way function and the identification information ID. These associations may be expressed as Formula (1).

$$\text{ChipSeed}i = \text{OWF1}(\text{MasterSeed}i, \text{ID}) \tag{1}$$

i is an integer from 1 to 3. That is, when the authentication-target apparatus 103 is shipped from a factory, ChipSeedi calculated using Formula (1) is stored in the authentication-target apparatus 103 along with the identification information ID. Similarly, MasterSeedi is stored in the authentication apparatus 106 when the authentication apparatus 106 is shipped from a factory. OWF1 is an abbreviation of one-way function. OWF1 may be a simple hash function, a cryptographic hash function, or the like. The authentication apparatus 106 can acquire the identification information ID from the authentication-target apparatus 103, and compute the chip seed using the identification information ID and the master seed retained by the authentication apparatus 106.

In order to reduce the storage capacity of the password memory 203a, the number of chip passwords ChipPWD is smaller than the number of the seeds ChipSeedi. Similarly, in order to reduce the storage capacity of the password memory 203b, the number of passwords MasterPWD is smaller than the number of seeds MasterSeedi. Even if the number of seeds ChipSeedi increases, the number of chip passwords ChipPWD need not be increased. Similarly, even if the number of seeds MasterSeedi increases, the number of passwords MasterPWD need not be increased.

Incidentally, Formula (1.5) may be established regarding the password MasterPWD and the chip password ChipPWD.

$$\text{ChipPWD} = \text{OWF2}(\text{OWF2}(\text{OWF2}(\text{OWF2}(\text{MasterPWD}, \text{ID}), \text{ID}), \text{ID}), \text{ID}) \tag{1.5}$$

OWF2 is a one-way function. OWF2 may also be a cryptographic hash function (e.g.: SHA2, SHA3). OWF and OWF2 may be the same or different. For example, OWF1 may be SHA3 for generating 16-byte output data from input data generated by coupling the ID, 0 padding, and MasterSeed. OWF2 may be SHA2 for generating 16-byte output data from input data generated by coupling the ID, 0 padding, and MasterPWD.

[Authentication Sequence]

Figure 4A:
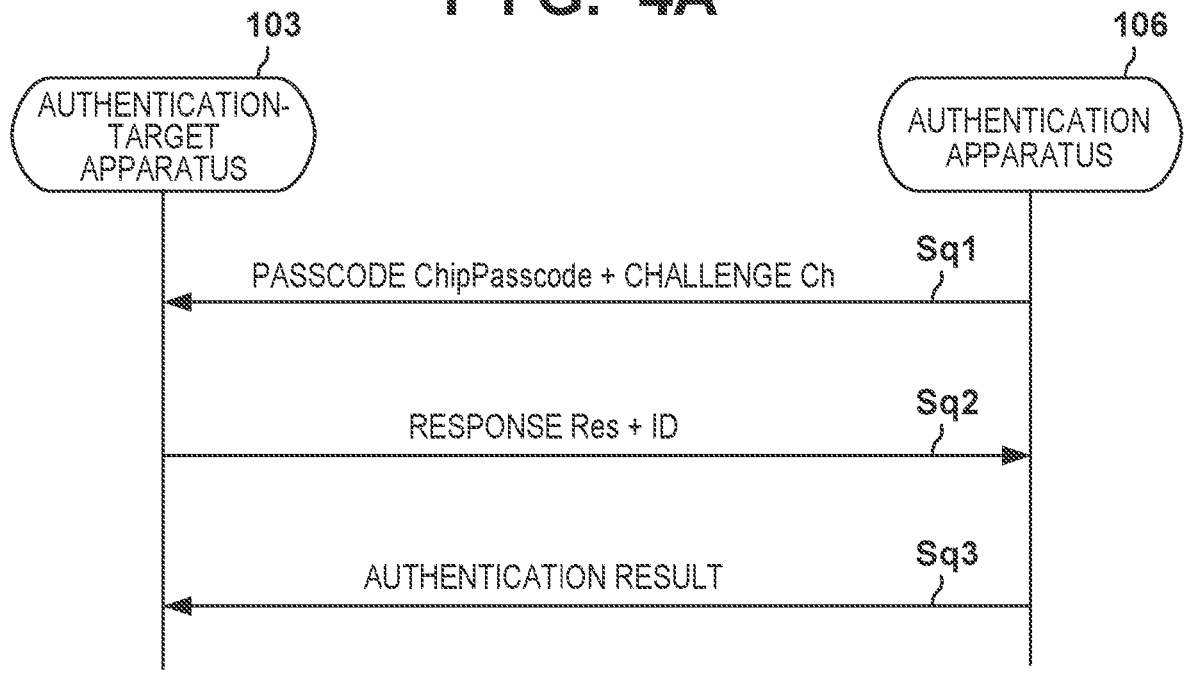
FIG. 4A is a diagram illustrating an authentication sequence according to one embodiment.

FIG. 4A shows an authentication sequence. At Sq1, the authentication apparatus 106 transmits a passcode ChipPasscode (may also be referred to as "code data") and a challenge Ch to the authentication-target apparatus 103. The authentication-target apparatus 103 receives the passcode ChipPasscode and the challenge Ch from the authentication apparatus 106. The authentication-target apparatus 103 executes password authentication by generating a passcode for comparison from the password ChipPWD, and by comparing the passcode for comparison with the passcode ChipPasscode. If the passcode ChipPasscode matches the passcode for comparison, the authentication-target apparatus 103 generates a response Res using the challenge Ch and a suitable seed ChipSeedi according the result of the password authentication.

At Sq2, the authentication-target apparatus 103 transmits the response Res and identification information ID to the authentication apparatus 106. The authentication apparatus 106 receives the response Res and the identification information ID from the authentication-target apparatus 103. The authentication apparatus 106 restores (generates) seed ChipSeedi' from the MasterSeedi that have been indirectly used to generate the passcode ChipPasscode and the identification information ID. Moreover, the authentication apparatus 106 generates a response Res' for comparison based on the restored seed ChipSeedi' and the challenge Ch, and compares the response Res' for comparison with the received response Res. This comparison processing is the apparatus authentication.

At Sq3, the authentication apparatus 106 transmits an authentication result based on the response Res to the authentication-target apparatus 103. The authentication-target apparatus 103 receives the authentication result from the authentication apparatus 106. The transmission and reception of the authentication result may be omitted. For example, if apparatus authentication has failed, the authentication apparatus 106 may restrict or prohibit the usage of a cartridge (replacement part or consumable) on which the authentication-target apparatus 103 is mounted. If the apparatus authentication has succeeded, the authentication apparatus 106 may allow the usage of a cartridge (replacement part or consumable) on which the authentication-target apparatus 103 is mounted.

Details of Processing in Authentication Apparatus

Figure 5:
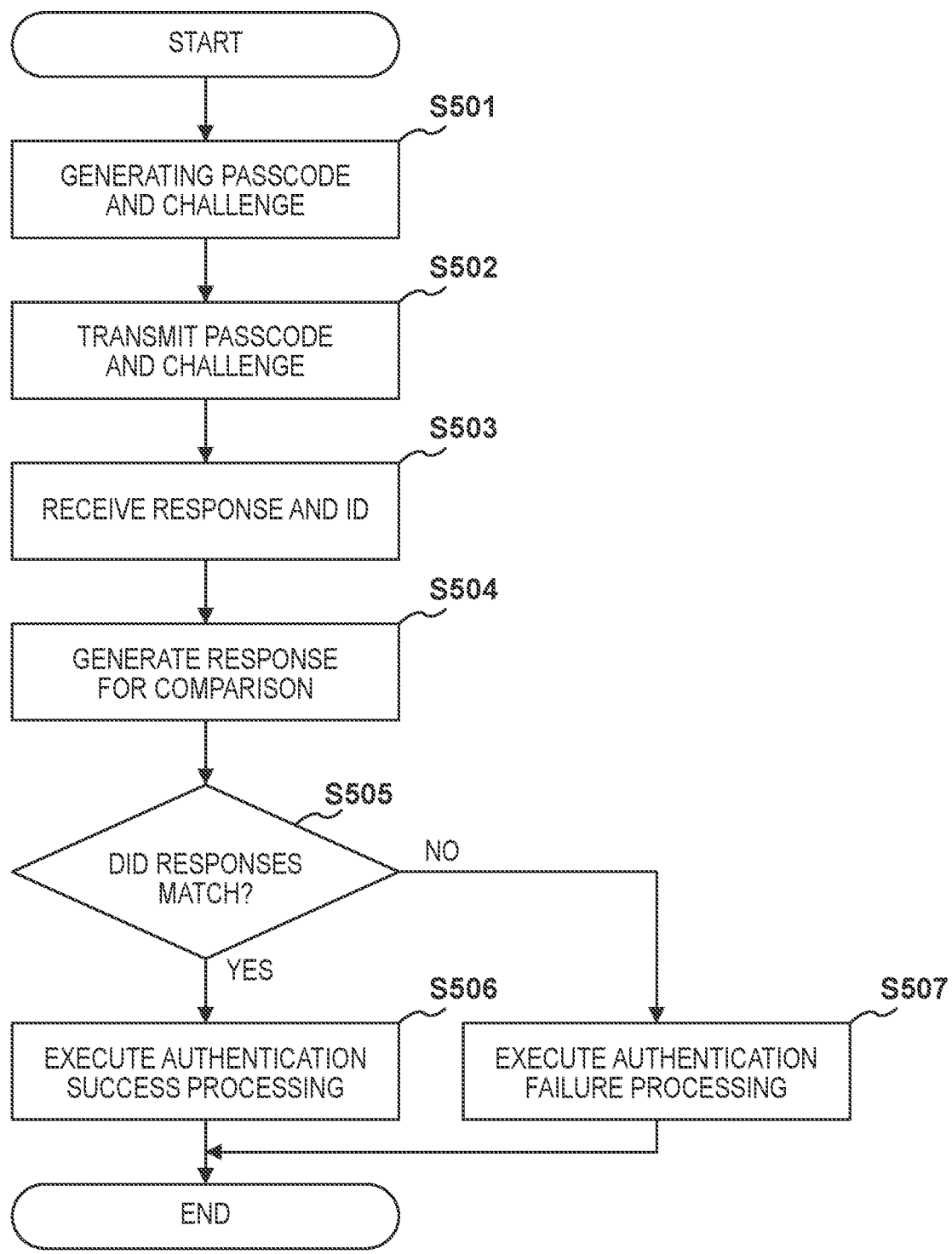
FIG. 5 is a flowchart illustrating authentication processing according to one embodiment.
Figure 6:
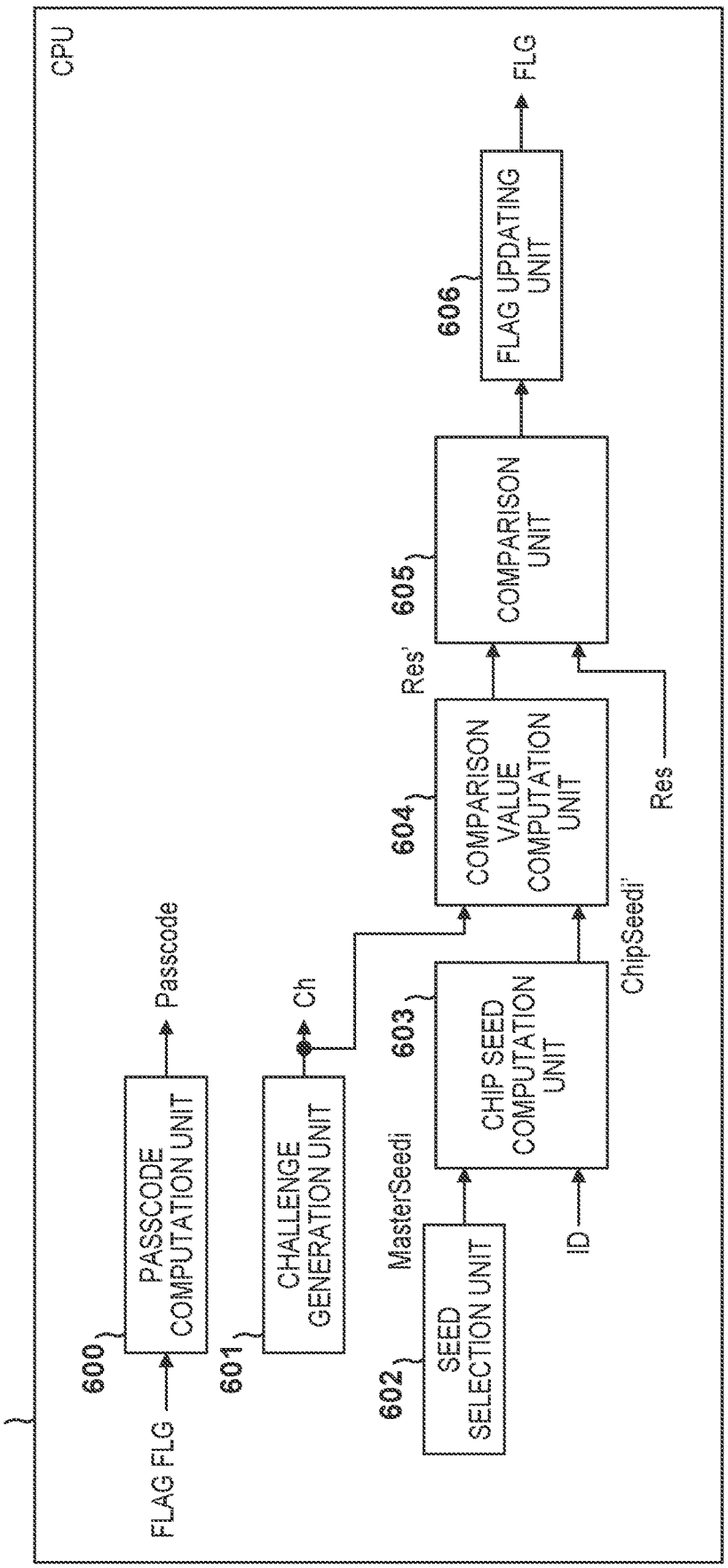
FIG. 6 is a diagram for describing functions of a CPU of the authentication apparatus according to one embodiment.

FIG. 5 shows authentication processing to be executed by the CPU 201b of the authentication apparatus 106. FIG. 6 shows a plurality of functions that are realized by the CPU 201b in accordance with the control program. Some of or all of the plurality of functions may be realized by a hardware circuit such as an ASIC or an FPGA. ASIC is an abbreviation of application-specific integrated circuit. FPGA is an abbreviation of field programmable gate array.

In step S501, the CPU 201b generates a passcode Passcode and a challenge Ch. As shown in FIG. 6, A passcode computation unit 600 computes the passcode Passcode based on a flag FLG. The flag FLG may be a counter for counting the number of computations of the passcode Passcode. For example, a flag updating unit 606 may increment the flag FLG by one every time a different passcode Passcode is generated. A challenge generation unit 601 generates the challenge Ch using a random number algorithm or the like. In this case, the challenge generation unit 601 may be realized by a random number generation circuit. The CPU 201b retains the challenge Ch in the RAM 205b. This challenge Ch is used when the response Res' for comparison is generated.

In step S502, the CPU 201b transmits the passcode Passcode and the challenge Ch to the authentication-target apparatus 103 using the communication circuit 202b. Here, an authentication command for requesting authentication receiving processing may be transmitted to the authentication-target apparatus 103.

In step S503, the CPU 201b receives a response Res and identification information ID from the authentication-target apparatus 103 using the communication circuit 202b. The CPU 201b retains the response Res in the RAM 205b.

In step S504, the CPU 201b generates a response Res' for comparison. As shown in FIG. 6, a seed selection unit 602 selects a seed MasterSeedi corresponding to the flag FLG, and sends the seed MasterSeedi to a chip seed computation unit 603. The chip seed computation unit 603 computes a seed ChipSeedi' by substituting the seed MasterSeedi and the identification information ID into Formula (1). The chip seed computation unit 603 sends the seed ChipSeedi' to a comparison value computation unit 604. The comparison value computation unit 604 generates a response Res' for comparison based on the challenge Ch read out from the RAM 205b and the seed ChipSeedi'. The comparison value computation unit 604 sends the response Res' for comparison to a comparison unit 605.

In step S505, the CPU 201b (comparison unit 605) determines whether or not the received response Res matches the response Res' for comparison. If the received response Res matches the response Res' for comparison, the CPU 201b advances the processing to step S506. In step S506, the CPU 201b executes authentication success processing. The authentication success processing includes permitting to use a replacement part or the like on which the authentication-target apparatus 103 is mounted, for example. If the received response Res does not match the response Res' for comparison, the CPU 201b advances the processing to step S507. In step S507, the CPU 201b executes authentication failure processing. The authentication failure processing includes restricting or prohibiting the usage of a replacement part or the like on which the authentication-target apparatus 103 is mounted, for example.

Details of Processing in Authentication-Target Apparatus

Figure 7:
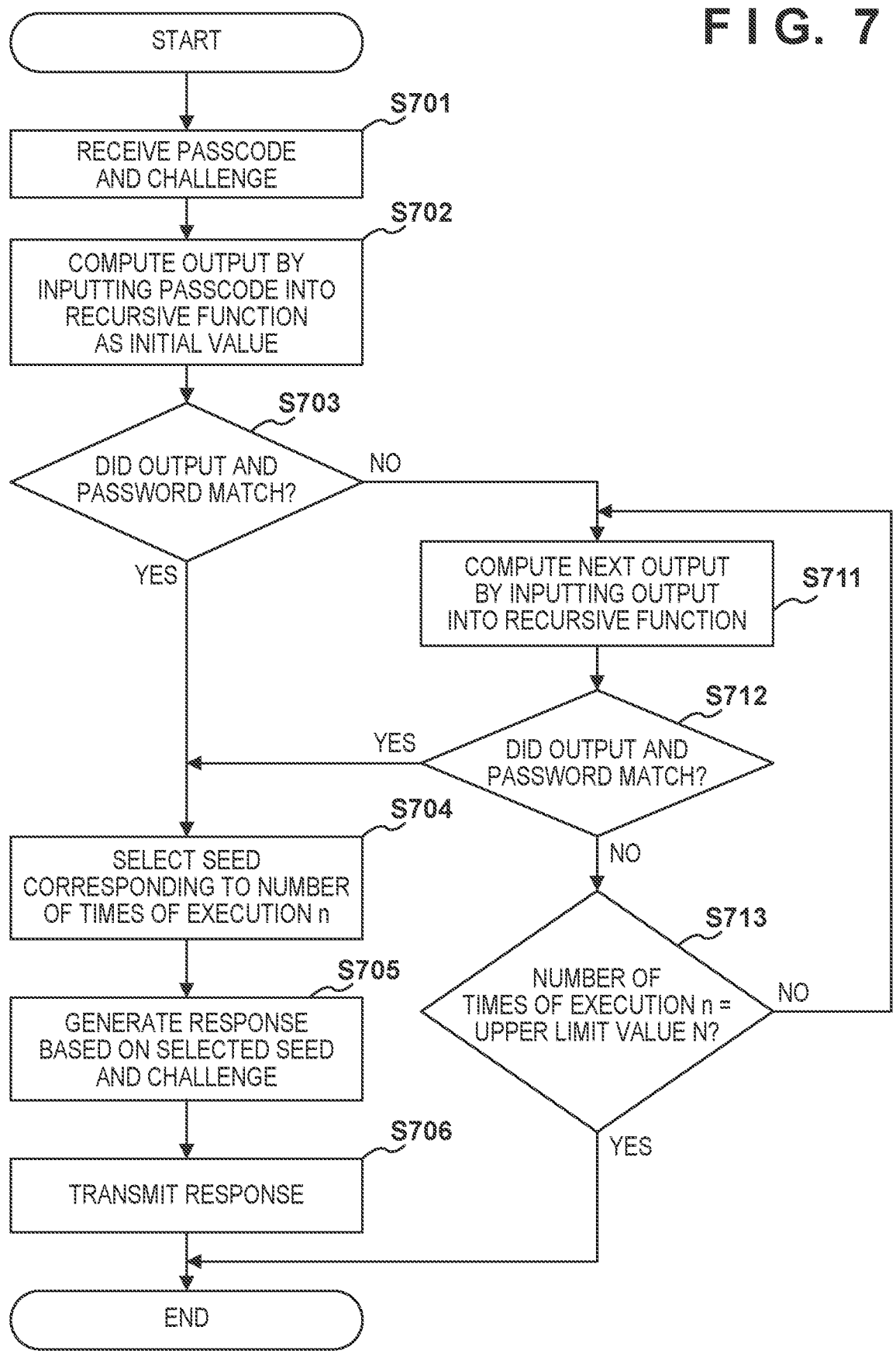
FIG. 7 is a flowchart illustrating authentication receiving processing according to one embodiment.
Figure 8:
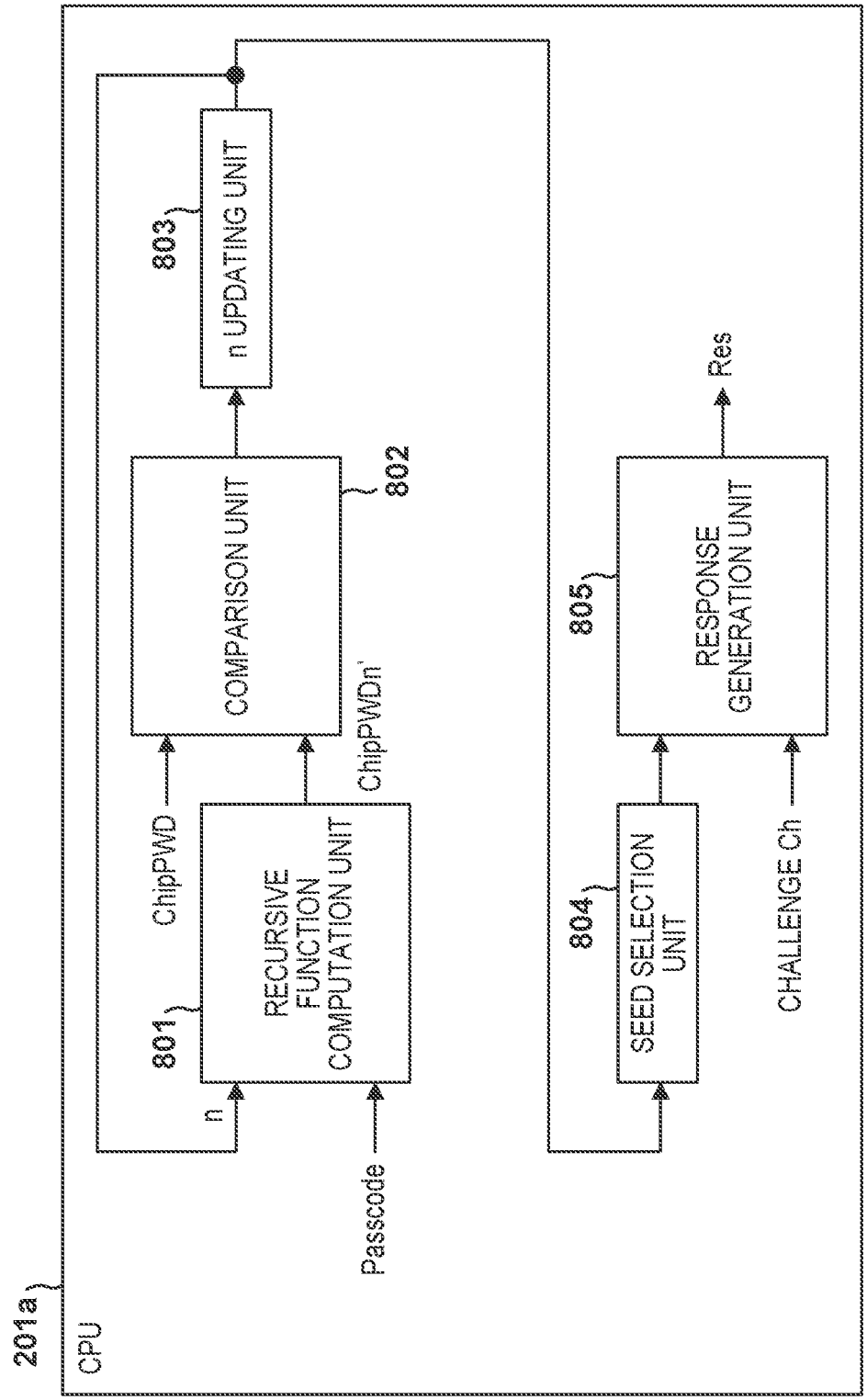
FIG. 8 is a diagram for describing functions of a CPU of the authentication-target apparatus according to one embodiment.

FIG. 7 shows authentication receiving processing to be executed by the CPU 201a of the authentication-target apparatus 103. FIG. 8 shows a plurality of functions to be realized by the CPU 201a in accordance with a control program. Some of or all of the plurality of functions may be realized by a hardware circuit such as an ASIC or an FPGA.

(1) Password Authentication

In step S701, the CPU 201a receives a passcode Passcode and a challenge Ch using the communication circuit 202a. The CPU 201a stores the passcode Passcode and the challenge Ch in the RAM 205a.

In step S702, the CPU 201a computes an output (password for comparison ChipPWD') by inputting the passcode Passcode into a recursive function as an initial value. The recursive function may be a recurrence relation using a one-way function. $n+1^{th}$ computation result of the recursive function is computed by inputting the $n^{th}$ computation result ChipPWDn' to the recursive function. As shown in FIG. 8, a first computation result ChipPWD1' of the recursive function is computed by inputting the passcode Passcode that is an initial value to a recursive function computation unit 801. The recursive function computation unit 801 generates an $n^{th}$ computation result ChipPWDn' by executing the repetitive computation (recursive computation) by the recursive function n times, which is the number of times of execution designated by a number n updating unit 803, and outputs the $n^{th}$ computation result ChipPWDn' to the comparison unit 802.

In step S703, the CPU 201a determines whether or not the output of the recursive function matches a password ChipPWD stored in the password memory 203a. For example, the comparison unit 802 determines whether or not the $n^{th}$ computation result ChipPWDn' matches a password ChipPWD stored in the password memory 203a. If matching therebetween is determined, the CPU 201a advances the processing to step S704. If matching therebetween is not determined, the CPU 201a advances the processing to step S711.

In step S711, the CPU 201a computes the next output by inputting the output of the recursive function to the recursive function as the next input. For example, the recursive function computation unit 801 computes an $n+1^{th}$ computation result based on an $n^{th}$ computation result.

In step S712, the CPU 201a determines whether or not the output of the recursive function matches the password ChipPWD stored in the password memory 203a. For example, the comparison unit 802 determines whether or not the $n+1^{th}$ computation result ChipPWDn+1' matches the password ChipPWD stored in the password memory 203a. If matching therebetween is determined, the CPU 201a advances the processing to step S704. If matching therebetween is not determined, the CPU 201a advances the processing to step S713.

In step S713, the CPU 201a determines whether or not the current number of times of execution n has reached an upper limit value N. Three seeds ChipSeed1 to 3 are present in Embodiment 1, and therefore the upper limit value N is 3. If the current number of times of execution n has reached the upper limit value N, the CPU 201a determines that the password authentication has failed, and ends the authentication receiving processing. If the current number of times of execution n has not reached the upper limit value N, the CPU 201a returns the processing to step S711. In this way, the computation by the recursive function is repeatedly executed until the number of times of execution n reaches the upper limit value N.

(2) Apparatus Authentication

In step S704, the CPU 201a (seed selection unit 804) selects the chip seed corresponding to the number of times of execution n. FIG. 9 shows the relationship between the number of times of execution n and the chip seed. When the number of times of execution n is 1, ChipSeed1 is selected. ChipSeed1 corresponds to passcode3 that is generated when the flag FLG is 0. When the number of times of execution n is 2, ChipSeed2 is selected. ChipSeed2 corresponds to passcode2 that is generated when the flag FLG is 1. When the number of times of execution n is 3, ChipSeed3 is selected. ChipSeed3 corresponds to passcode1 that is generated when the flag FLG is 2. The seed selection unit 804 sends the selected chip seed to the response generation unit 805.

In step S705, the CPU 201a generates a response Res using the selected chip seed and a challenge Ch read out from the RAM 205a. As shown in FIG. 8, the response generation unit 805 generates the response Res using the chip seed selected by the seed selection unit 804 and the challenge Ch.

In step S706, the CPU 201a transmits the response Res to the authentication apparatus 106 using the communication circuit 202a. Note that, if the password authentication has failed, the CPU 201a may not transmits the response Res, or may transmits a random number, a fixed value, or the like, as the response Res. With this, the authentication apparatus 106 can recognized that the authentication has failed.

About Passcode

The passcode computation unit 600 generates a passcode Passcode using a one-way function OWF2, for example. A formula similar to Formula (1.5) may be used as this computation method. Here, passcode1 may be OWF2(MasterPWD, ID). passcode2 can be generated from passcode1 (passcode2=OWF2(passcode1, ID)). passcode3 can be generated from passcode2 (passcode3=OWF2(passcode2, ID)=OWF2(OWF2(passcode1, ID), ID)=OWF2(OWF2(OWF2(MasterPWD, ID), ID), ID))). However, passcode1 cannot be computed from passcode2 and passcode3. This is because passcodej+1 is obtained by OWF2(passcodej, ID). That is, it means that when passcode3 is first transmitted among passcode1 to 3, passcode1 and 2 will not be leaked.

As shown in FIG. 9, when the flag FLG is 0, the passcode computation unit 600 generates passcode3. Note that, when the flag FLG is 0, the seed selection unit 602 selects a seed MasterSeedi1. As shown in FIG. 9, the seed MasterSeedi1 corresponds to the seed ChipSeed1. Note that, from Formula (1.5), the computation result obtained by once processing passcode3 and the ID using OWF2 matches the password ChipPWD.

As shown in FIG. 9, when the flag FLG is 1, the passcode computation unit 600 generates passcode2. Note that, when the flag FLG is 1, the seed selection unit 602 selects a seed MasterSeedi2. As shown in FIG. 9, the seed MasterSeedi2 corresponds to the seed ChipSeed2. Note that, from Formula (1.5), the computation result obtained by twice processing passcode3 and the ID using OWF2 matches the password ChipPWD.

As shown in FIG. 9, when the flag FLG is 2, the passcode computation unit 600 generates passcode1. Note that, when the flag FLG is 2, the seed selection unit 602 selects a seed MasterSeedi3. As shown in FIG. 9, the seed MasterSeedi3 corresponds to the seed ChipSeed3. Note that, from Formula (1.5), the computation result obtained by processing passcode3 and the ID three times using OWF2 matches the password ChipPWD.

In this way, the passcode is generated by repetitive computation by a recursive function using the password MasterPWD as an initial value. Similarly, the password ChipPWD of the authentication-target apparatus 103 is generated in advance by repetitive computation by a recursive function using the password MasterPWD is an initial value. For example, the password ChipPWD is generated by M times of repetitive computations. Therefore, the passcode to be transmitted from the authentication apparatus 106 need only be generated by M-1 times or less of repetitive computations. For example, the passcode generated by two times of repetitive computations in the authentication apparatus 106 matches the password ChipPWD obtained by one time of repetitive computation performed in the authentication-target apparatus 103. The passcode generated by one time of repetitive computation matches the password ChipPWD by two times of repetitive computations. Therefore, there is a fixed relationship between the number of times of repetitive computations executed by the authentication apparatus 106 and the number of times of repetitive computation executed by the authentication-target apparatus 103. Therefore, if the number of times of repetitive computations executed by the authentication apparatus 106 is associated with MasterSeed, and the number of times of repetitive computations executed by the authentication-target apparatus 103 is associated with ChipSeed, MasterSeed is associated with ChipSeed. As a result, the response Res' for comparison matches the response.

Computation Method of Response

The response generation unit 805 may generate the response Res by substituting the challenge Ch and the seed ChipSeedi into a predetermined function. Formula (2) is an example of the predetermined function.

$$\text{Res}=f(\text{challenge } Ch, \text{ChipSeed}i) \quad (2)$$

The function f( ) may be a one-way function (e.g.: SHA3), or may not be a one-way function. The comparison value computation unit 604 of the authentication apparatus 106 similarly computes the response Res' for comparison using Formula (2). The important thing is that the response generation unit 805 and the comparison value computation unit 604 use the same function f( ).

Updating of Flag

The flag updating unit 606 increments the flag FLG by one when the authentication processing with respect to the authentication-target apparatus 103 is completed. Note that the authentication apparatus 106 may execute three times of authentication processing by sequentially transmitting three passcodes while incrementing the flag FLG by 1. That is, three times of authentication processing may be executed using one ChipPWD and three different chip seeds. For example, when the authentication apparatus 106 is powered on and activated, one time of authentication processing may be executed by transmitting one passcode to the authentication-target apparatus 103. When the authentication apparatus 106 is powered on and activated, three times of authentication processing may also be executed by sequentially transmitting three different passcodes to the authentication-target apparatus 103. That is, for each activation, one time of authentication processing may be executed, or three times of authentication processing may be executed.

Embodiment 2

FIG. 10 shows an authentication apparatus 106 and an authentication-target apparatus 103 of Embodiment 2. In Embodiment 2, the items in common with Embodiment 1 are given the same reference signs, and the description thereof will be omitted.

As shown in FIG. 10, the authentication-target apparatus 103 includes a private memory 1001a and a public memory 1002a. As shown in FIG. 11A, the private memory 1001a stores three authentication-target keys Bk10 to Bk12 that are pieces of private information. A password memory 203a is also a private memory and stores one password ChipPWD. The pieces of private information stored in the password memory 203a and the private memory 1001a cannot be read out from the outside of the authentication-target apparatus 103. As shown in FIG. 11B, the public memory 1002a stores three keys ID10 to ID12 and identification information CRGID that are pieces of public information. The identification information CRGID is identification information for identifying the process cartridge 102. The public information can be read out from the outside of the authentication-target apparatus 103. The key ID10 is key identification information that is associated with the pair between the authentication-target key Bk10 and an authentication key Mk10. The key ID11 is key identification information that is associated with the pair between the authentication-target key Bk11 and an authentication key Mk11. The key ID12 is key identification information that is associated with the pair between the authentication-target key Bk12 and an authentication key Mk12.

As shown in FIG. 10, the authentication apparatus 106 includes a private memory 1001b and a public memory 1002b. As shown in FIG. 11C, the private memory 1001b stores the three authentication keys Mk10 to Mk12 that are pieces of private information. A password memory 203b is also a private memory, and stores one password MasterPWD. The pieces of private information stored in the password memory 203b and the private memory 1001b cannot be read out from the outside of the authentication apparatus 106. As shown in FIG. 11D, the public memory 1002b stores three keys ID10 to ID12 that are pieces of public information. The public information can be read out from the outside of the authentication apparatus 106.

In Embodiment 2, similarly to Embodiment 1, if the password authentication has succeeded, apparatus authentication using keys is executed. That is, the three authentication-target keys Bk10 to Bk12 are protected by one password ChipPWD. The three authentication keys Mk10 to Mk12 are protected by one password MasterPWD.
[Relationship Between Authentication-Target Key Bki and Authentication Key Mki]

A predetermined relationship establishes between the authentication-target key Bki and the authentication key Mki. Formula (3) is an example of the predetermined relationship $$B_{ki}=OWF1(M_{ki},CRGID) \quad (3)$$

i is an index, and is any one of integers from 10 to 12, in this example. OWF1 is a one-way function. The one-way function OWF1 may also be a cipher function conforming to AES (Advanced Encryption Standard) or a hash function.
[Relationship Between ChipPWD and MasterPWD]

Formula (4) and Formula (5) establish between the password ChipPWD and the password MasterPWD.

$$ChipPassCode=OWF2(MasterPWD,CRGID) \quad (4)$$

$$ChipPWD=OWF3(OWF3(OWF3(ChipPassCode))) \quad (5)$$

Here, OWF2 and OWF3 are each a one-way function. In this way, the password ChipPWD is obtained by performing three times of repetitive computations, using the one-way function OWF3, on the computation result obtained by inputting the password MasterPWD and the identification information CRGID into the one-way function OWF2. Formula (4) and Formula (5) indicate that the ChipPWD can be obtained by a recursive function (recurrence relation) using the ChipPassCode as an initial value. In this example, the number of times of execution of repetitive computations is 3, but the number of times of execution may also be 4 or more.

The authentication keys Mk10, Mk11, and Mk12, the keys ID10, ID11, and ID12, and MasterPWD are written into the authentication apparatus 106 at a factory at which the authentication apparatus 106 is manufactured. The authentication-target keys Bk10, Bk11, and Bk12, the keys ID10, ID11, and ID12, and ChipPWD are written into the authentication-target apparatus 103 in advance at a factory at which the authentication-target apparatus 103 is manufactured.
[Authentication Sequence]

Figure 4B:
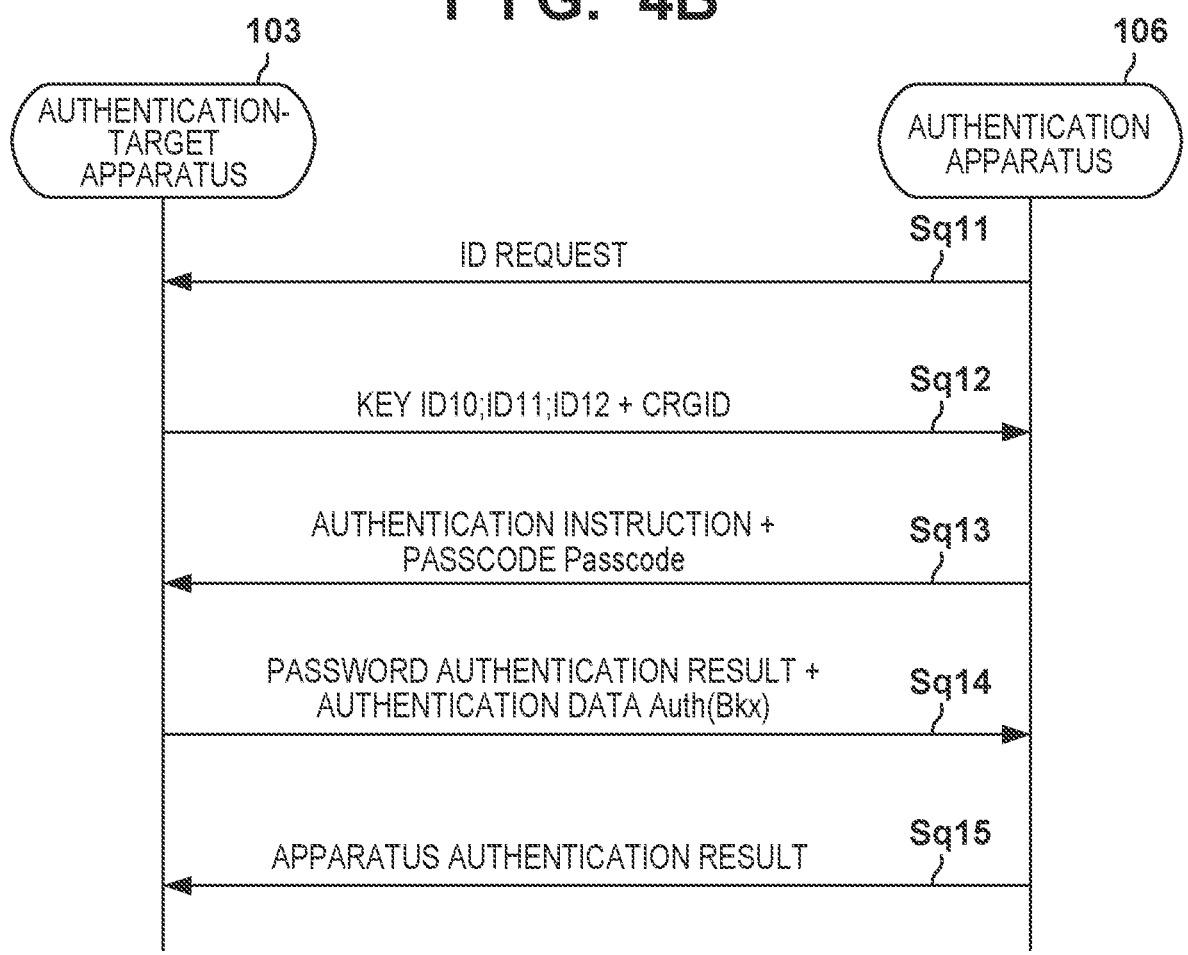
FIG. 4B is a diagram illustrating an authentication sequence according to one embodiment.

FIG. 4B shows the authentication sequence of Embodiment 2. At Sq11, the authentication apparatus 106 transmits a read-out request (command) of the key ID to the authentication-target apparatus 103. The authentication-target apparatus 103 receives the read-out request from the authentication apparatus 106. The authentication-target apparatus 103 reads out the keys ID10 to ID12 and the identification information CRGID from the public memory 1002a in accordance with the read-out request.

At Sq12, the authentication-target apparatus 103 transmits the keys ID10 to ID12 and the identification information CRGID to the authentication apparatus 106. The authentication apparatus 106 receives the keys ID10 to ID12 and the identification information CRGID from the authentication-target apparatus 103. The keys ID10 to ID12 and the identification information CRGID that are received from the authentication-target apparatus 103 are temporarily stored in the RAM 205b. The authentication apparatus 106 determines one key IDx by comparing the keys ID10 to ID12 stored in the public memory 1002b with the received keys ID10 to ID12. x is an index, and is any one of integers from 10 to 12. If no keys ID10 to ID12 stored in the public memory 1002b match any of the received keys ID10 to ID12, the authentication processing has failed. If a plurality of matching keys ID are present, one key IDx is determined using a random number or the like. The authentication apparatus 106 obtains a passcode Passcode using the identification information CRGID and the password MasterPWD stored in the password memory 203b.

At Sq13, the authentication apparatus 106 transmits an authentication instruction (command) that includes the passcode Passcode to the authentication-target apparatus 103. The key IDx can be basically specified from the number of times of execution of repetitive computation in the password authentication, and therefore the transmission of the key IDx is not essential. That is, when the selected key IDx is desired to be concealed, the key IDx is not transmitted. That is, the transmission of the key IDx is optional. The authentication-target apparatus 103 receives the authentication instruction (command) including the passcode Passcode from the authentication apparatus 106. The key IDx may be optionally received. The authentication-target apparatus 103 generates a password for comparison ChipPWD' using the passcode Passcode received from the authentication apparatus 106. The password for comparison ChipPWD' is generated by repetitive computation that is executed n times. The number of times of execution n is associated with the key IDx, and therefore the number of times of execution n may also be specified from the received key IDx. In the case where the key IDx is not received, the searching of a password for comparison ChipPWD' that matches the password ChipPW is executed by repetitive computation using the passcode Passcode as an initial value. With this, the number of times of execution n of the repetitive computation is specified, and the key IDx is specified from the number of times of execution n. In the repetitive computation, a recursive function is used similarly to Embodiment 1.

In this way, the authentication-target apparatus 103 determines whether or not the password ChipPWD stored in the password memory 203a matches the password for comparison ChipPWD' (password authentication). If the password ChipPWD does not match the password for comparison ChipPWD', the authentication-target apparatus 103 determines that the password authentication has failed. If the password ChipPWD matches the password for comparison ChipPWD', the authentication-target apparatus 103 generates authentication data Auth(Bkx) using an authentication-target key Bkx corresponding to the key IDx. Here, Auth( ) is an authentication computation function (e.g.: one-way function) for generating authentication data from a key.

At Sq14, the authentication-target apparatus 103 transmits the password authentication result (success/failure) and the authentication data Auth(Bkx) to the authentication apparatus 106. The authentication apparatus 106 receives the password authentication result and the authentication data Auth(Bkx) from the authentication-target apparatus 103. If the password authentication result indicates success, the authentication apparatus 106 executes apparatus authentication using the authentication data Auth(Bkx). The authentication apparatus 106 obtains an authentication-target key Bkx' from an authentication key Mkx specified by the key IDx. Moreover, the authentication apparatus 106 generates authentication data for comparison Auth(Bkx') using the authentication-target key Bkx'. The authentication apparatus 106 determines whether or not the authentication data for comparison Auth(Bkx') matches the received authentication data Auth(Bkx) (apparatus authentication).

At Sq15, the authentication apparatus 106 transmits the apparatus authentication result (success/failure) to the authentication-target apparatus 103. The authentication-target apparatus 103 receives the apparatus authentication result (success/failure) from the authentication apparatus 106.

Processing in Authentication Apparatus

Figure 12:
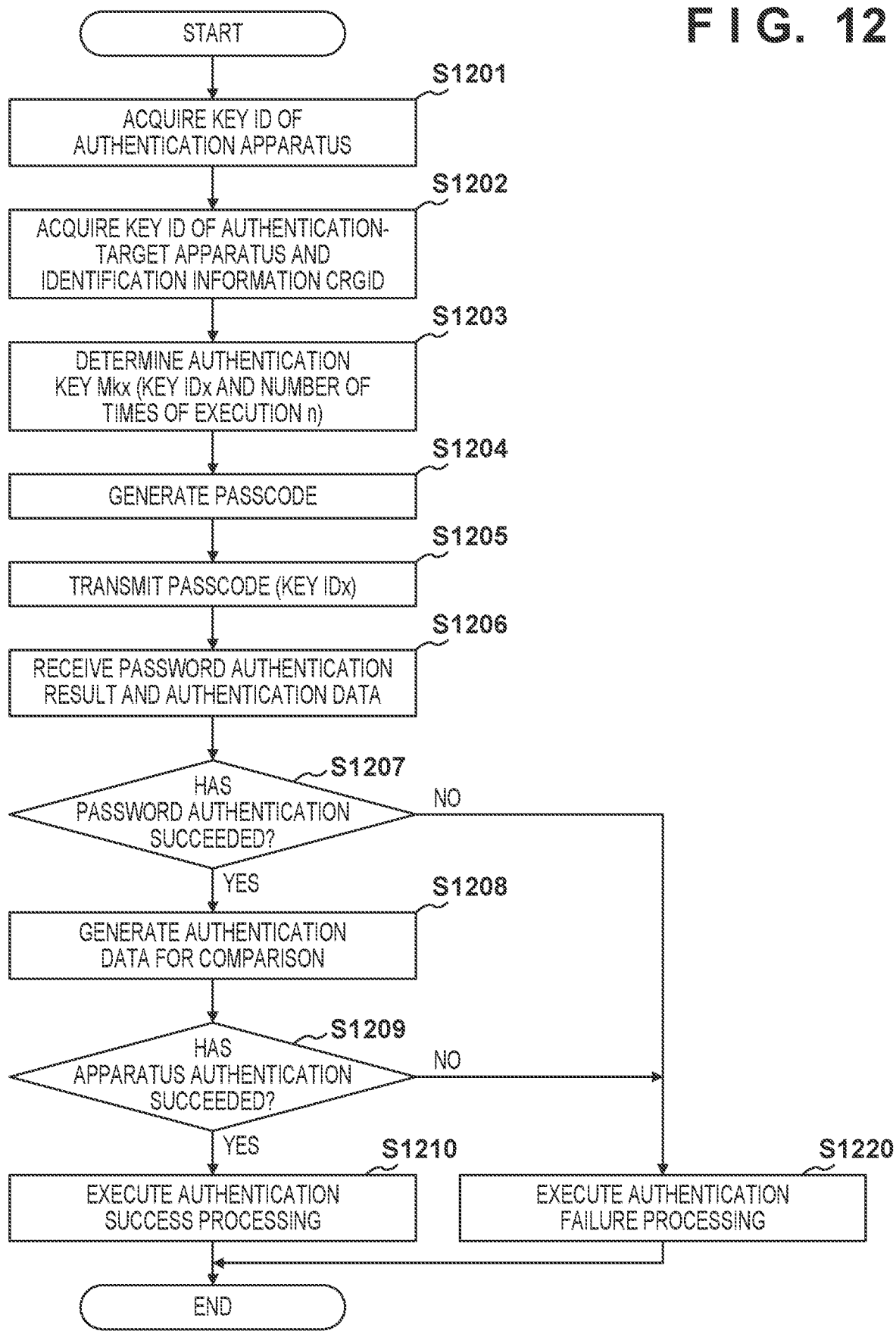
FIG. 12 is a flowchart illustrating authentication processing according to one embodiment.
Figure 13:
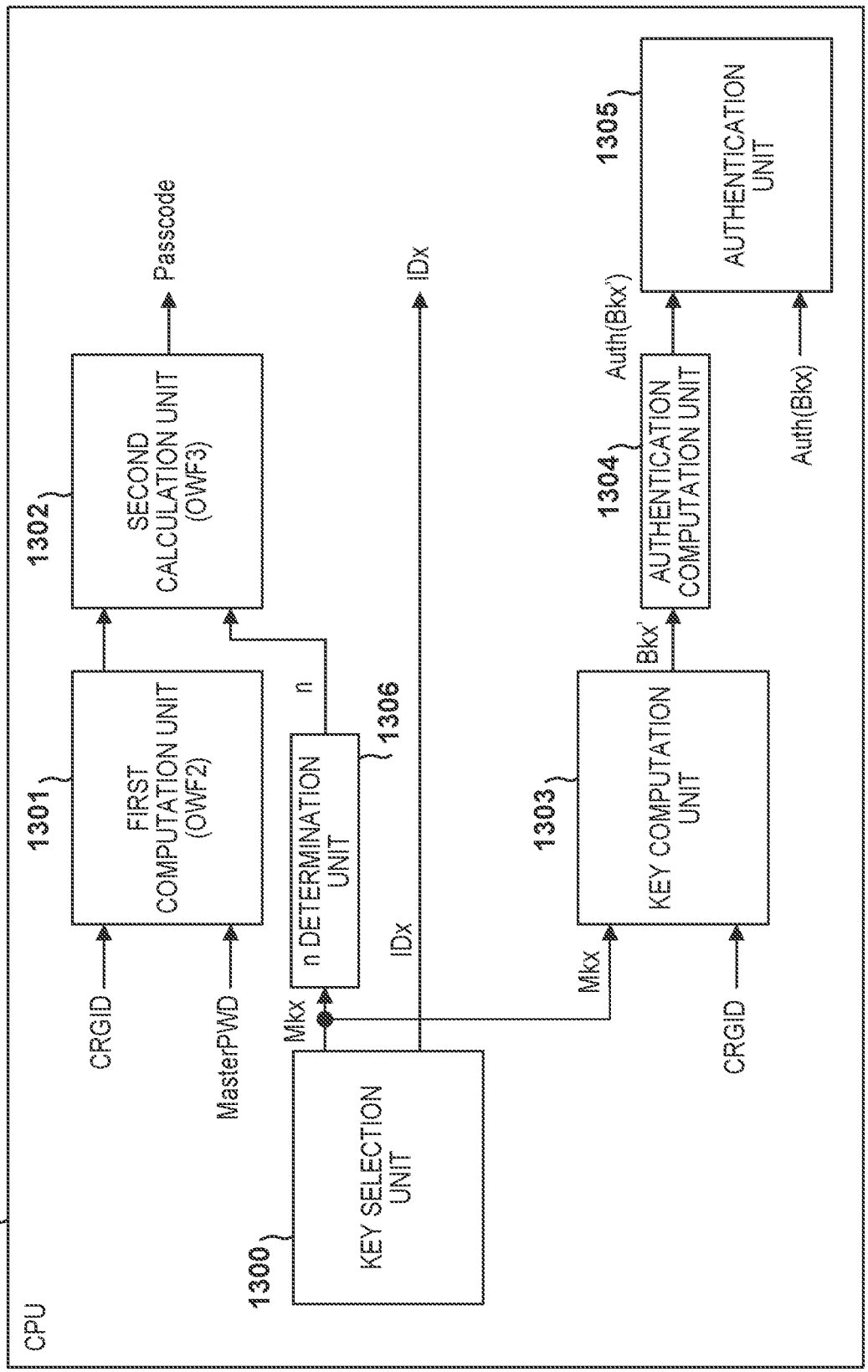
FIG. 13 is a diagram for describing functions of a CPU of the authentication apparatus according to one embodiment.

FIG. 12 shows the authentication processing to be executed by the CPU 201b of the authentication apparatus 106 in accordance with a control program. FIG. 13 shows a plurality of functions to be realized by the CPU 201b in accordance with the control program. Some of or all of the plurality of functions may be realized by a hardware circuit such as an ASIC or an FPGA.

In step S1201, the CPU 201b acquires the keys ID10, ID11, and ID12 from the public memory 1002b. In step S1202, the CPU 201b acquires the keys ID10, ID11, and ID12 and the identification information CRGID from the public memory 1002a of the authentication-target apparatus 103 using the communication circuit 202b. The CPU 201b acquires the keys ID10, ID11, and ID12 and the identification information CRGID of the authentication-target apparatus 103 by transmitting an ID request to the authentication-target apparatus 103. The CPU 201b temporarily stores the keys ID10, ID11, and ID12 and the identification information CRGID of the authentication-target apparatus 103 in the RAM 205b.

In step S1203, the CPU 201b determines one authentication key Mkx and key IDx based on the keys ID10, ID11, and ID12 of the authentication apparatus 106 and the keys ID10, ID11, and ID12 of the authentication-target apparatus 103. As shown in FIG. 13, the key selection unit 1300 determines one key IDx that is common between the keys ID10, ID11, and ID12 of the authentication apparatus 106 and the keys ID10, ID11, and ID12 of the authentication-target apparatus 103. The key IDx is associated with the authentication key Mkx, and therefore the key selection unit 1300 can specify the authentication key Mkx from the key IDx.

In step S1204, the CPU 201b generates a passcode Passcode based on the identification information CRGID, the password MasterPWD, and the authentication key Mkx (key IDx). As shown in FIG. 13, a number n determination unit 1306 determines the number of times of execution n of repetitive computation based on the key IDx associated with the authentication key Mkx.

A first computation unit 1301 computes ChipPassCode by substituting the identification information CRGID and the password MasterPWD into Formula (4), and outputs the ChipPassCode to the second computation unit 1302. The second computation unit 1302 computes the passcode Passcode by repetitive computation that is executed n times using ChipPassCode output from the first computation unit 1301 as an initial value. The second computation unit 1302 adopts a one-way function OWF3 as the recursive function and executes recursive computation n times. The number n is set to the second computation unit 1302 by the number n determination unit 1306. If n=1, passcode Passcode=OWF3 (ChipPassCode). If n=2, passcode Passcode=OWF3(OWF3 (ChipPassCode)). If n=3, passcode Passcode=OWF3(OWF3 (OWF3(ChipPassCode))).

For example, the number n determination unit 1306 may determines the number n such that the number n is incremented from 1 to 3 by 1. In this case, the configuration may be such that the number n is determined first, and the authentication key Mkx corresponding to the number n is selected by the key selection unit 1300. In this case, the transmission of the key IDx may be omitted. This is because the number of times of execution n is associated with the key IDx. The authentication-target apparatus 103 applies a recursive function to the received passcode Passcode. The authentication-target apparatus 103 may executes repetitive computation by the recursive function until an output (ChipPWD') that matches the password ChipPWD is obtained. When the number of times of execution n at which the output (ChipPWD') that matches the password ChipPWD is obtained is determined, an authentication-target key Bkx corresponding to the number of times of execution n is specified.

In step S1205, the CPU 201b transmits the passcode Passcode and the key IDx to the authentication-target apparatus 103 using the communication circuit 202b. Here, an authentication start command for instructing to execute the authentication receiving processing may be transmitted.

In step S1206, the CPU 201b receives the password authentication result and the authentication data Auth(Bkx) using the communication circuit 202b. In step S1207, the CPU 201b determines whether or not the password authentication has succeeded based on the password authentication result. If the password authentication has failed, the CPU 201b advances the processing to step S1220. The processing in step S1220 is the same as that in step S570. If the password authentication has succeeded, the CPU 201b advances the processing to step S1208.

In step S1208, the CPU 201b generates authentication data for comparison Auth(Bkx') using the authentication key Mkx. As shown in FIG. 13, a key computation unit 1303 generates the authentication-target key Bkx' using the identification information CRGID of the authentication-target apparatus 103 and the authentication key Mkx selected by the key selection unit 1300. In this computation, Formula (3) is used. The key computation unit 1303 sends the authentication-target key Bkx' to an authentication computation unit 1304. The authentication computation unit 1304 generates the authentication data for comparison Auth(Bkx') by inputting the authentication-target key Bkx' into the authentication computation function Auth( ) and sends the authentication data for comparison Auth(Bkx') to the authentication unit 1305.

In step S1209, the CPU 201b determines whether or not the apparatus authentication has succeeded by comparing the authentication data for comparison Auth(Bkx') with the received authentication data Auth(Bkx). As shown in FIG. 13, an authentication unit 1305 determines whether or not the authentication data for comparison Auth(Bkx') matches the received authentication data Auth(Bkx). If matching therebetween is determined, the authentication unit 1305 determines that the apparatus authentication has succeeded, and the processing is advanced to step S1210. The processing in step S1210 is the same as that in step S506. On the other hand, if the authentication data for comparison Auth (Bkx') does not match the received authentication data Auth(Bkx), the CPU 201b advances the processing to step S1220.

Authentication Receiving Processing in Authentication-Target Apparatus

Figure 14:
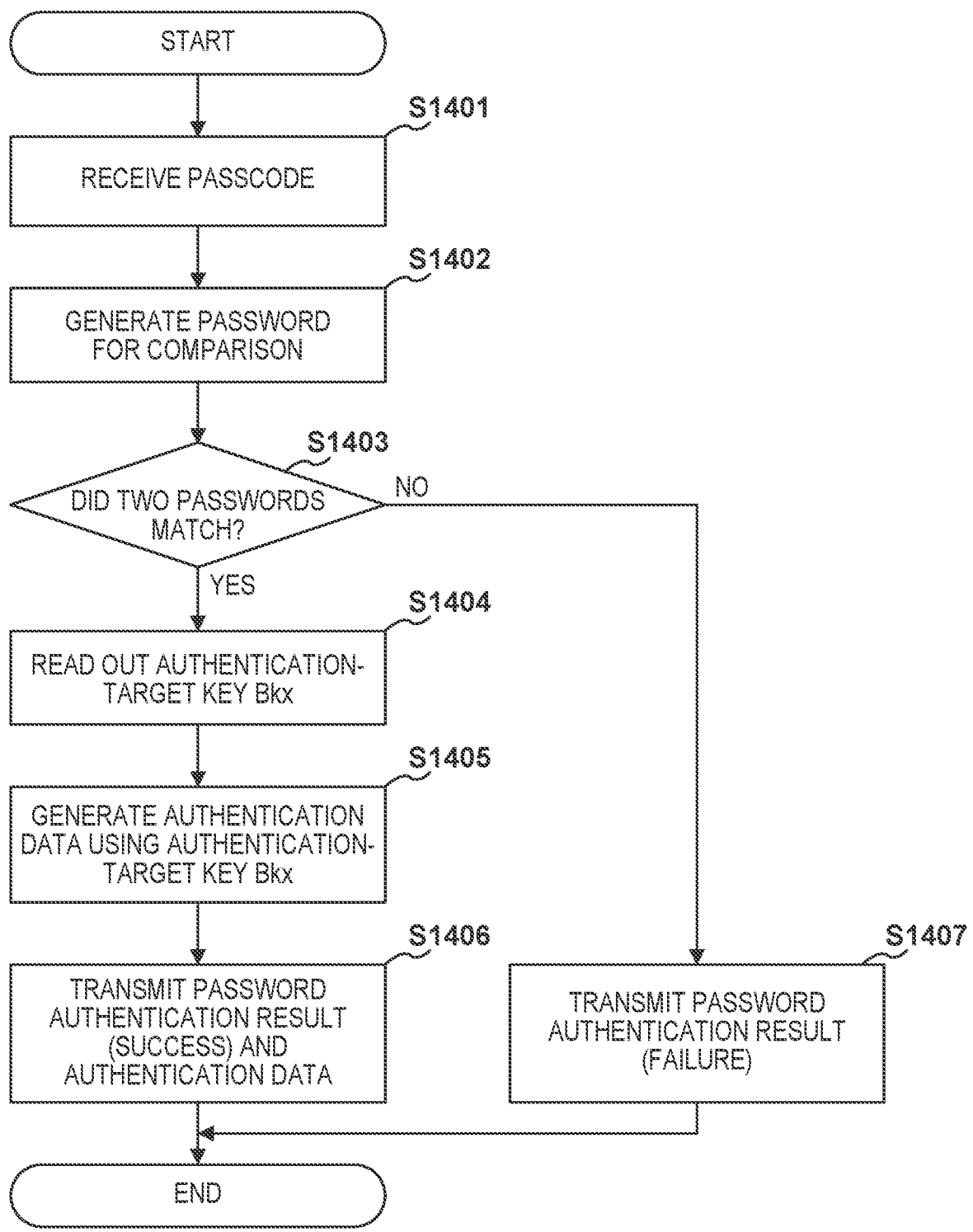
FIG. 14 is a flowchart illustrating authentication receiving processing according to one embodiment.
Figure 15:
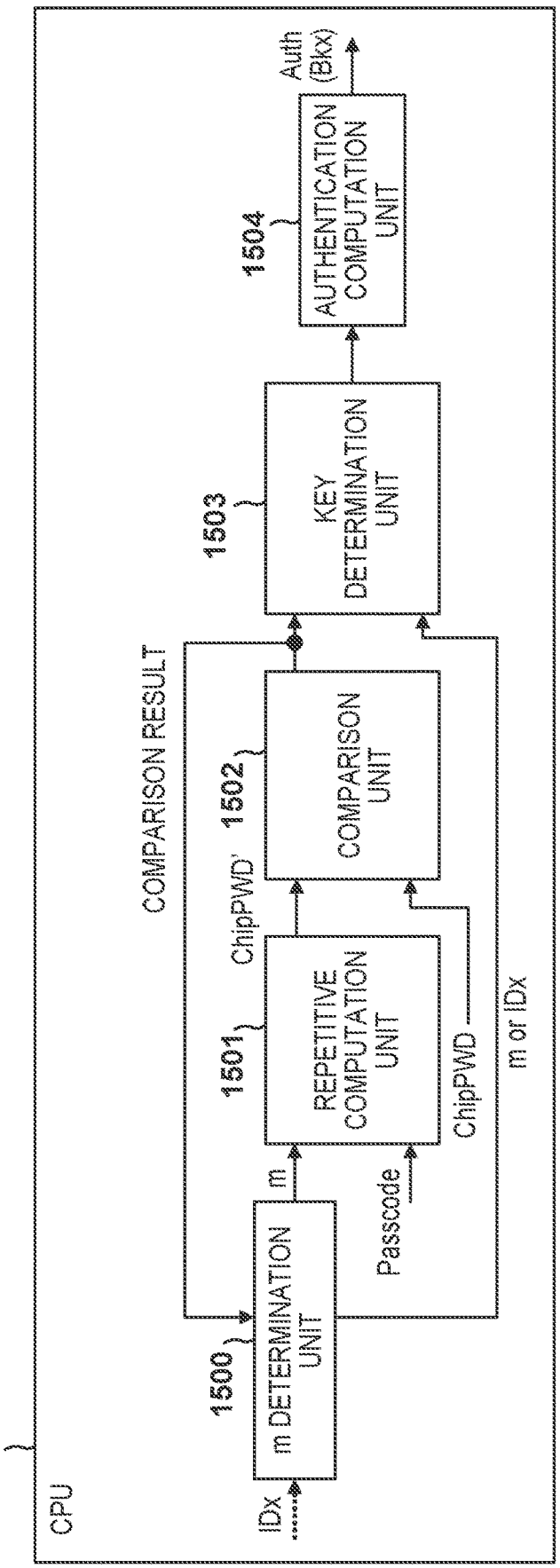
FIG. 15 is a diagram for describing functions of a CPU of the authentication-target apparatus according to one embodiment.

FIG. 14 shows the authentication receiving processing to be executed by the CPU 201a of the authentication-target apparatus 103. FIG. 15 shows a plurality of functions to be realized by the CPU 201a in accordance with a control program. Some of or all of the plurality of functions may be realized by a hardware circuit such as an ASIC or an FPGA.

In step S1401, the CPU 201a receives the passcode Passcode using the communication circuit 202a. The key IDx may also be optionally received.

In step S1402, the CPU 201a generates a password for comparison ChipPWD' based on the passcode Passcode.

When the key IDx is received, the CPU 201a (number m determination unit 1500) determines the number of times of execution m of repetitive computation from the key IDx.

As shown in FIG. 15, the number m determination unit 1500 sets the number of times of execution m in a repetitive computation unit 1501. The repetitive computation unit 1501 generates the password for comparison ChipPWD' by repetitive computation that is executed m times by a recursive function using the passcode Passcode as an initial value.

When the key IDx is not received, the number m determination unit 1500 set 1 to m as an initial value. The repetitive computation unit 1501 generates the password for comparison ChipPWD' by a recursive function using the passcode Passcode as an initial value (initial input). A comparison unit 1502 determines whether or not the password for comparison ChipPWD' matches the password ChipPWD. If the password for comparison ChipPWD' matches the password ChipPWD, the number m (=1) at this time is adopted. If the password for comparison ChipPWD' does not match the password ChipPWD, the number m determination unit 1500 updates m by adding 1 to m, and sets the updated m to the repetitive computation unit 1501. The repetitive computation unit 1501 generates the password for comparison ChipPWD' by repetitive computation that is executed m times by a recursive function using the passcode Passcode as an initial value. The comparison unit 1502 determines whether or not the password for comparison ChipPWD' matches the password ChipPWD. The number of times of execution m may be searched in this way. In this case, the number of times of execution m can be incremented from 1 to an upper limit value M. If the password for comparison ChipPWD does not match the password ChipPWD even if the number of times of execution m reaches M, it is determined that the password authentication has failed.

In step S1403, the CPU 201a determines whether or not the password for comparison ChipPWD has matched the password ChipPWD. Note that, in the case of not receiving the key IDx, the processing in step S1403 is a part of processing in step S1402. If the password for comparison ChipPWD has not matched the password ChipPWD, the CPU 201a advances the processing to step S1407. In step S1407, the CPU 201a transmits the password authentication result (failure) to the authentication apparatus 106 using the communication circuit 202a. On the other hand, if the password for comparison ChipPWD has matched the password ChipPWD, the CPU 201a advances the processing to step S1404.

In step S1404, the CPU 201a reads out the authentication-target key Bkx to be identified by the received key IDx or the key IDx corresponding to the number of times of execution m, from the private memory 1001a. As shown in FIG. 15, a key determination unit 1503 determines an authentication-target key Bkx based on the received key IDx or the key IDx corresponding to the number of times of execution m, and sets the authentication-target key Bkx in an authentication computation unit 1504.

In step S1405, the CPU 201a generates authentication data Auth(Bkx) using the authentication-target key Bkx. As shown in FIG. 15, the authentication computation unit 1504 computes the authentication data Auth(Bkx) by substituting the authentication-target key Bkx into the authentication computation function Auth( ).

In step S1406, the CPU 201a transmits the password authentication result (success) and the authentication data Auth(Bkx) to the authentication apparatus 106 using the communication circuit 202a.

Relationship Between Number of Times of Execution n and Authentication-Target Key Bk If ChipPWD' obtained by setting m=1 matches the password ChipPWD, the authentication-target key Bk10 is selected. That is, the key ID10 is specified.

If ChipPWD' obtained by setting m=2 matches the password ChipPWD, the authentication-target key Bk11 is selected. That is, the key ID11 is specified.

If ChipPWD' obtained by setting m=3 matches the password ChipPWD, the authentication-target key Bk12 is selected. That is, the key ID12 is specified.

If the key IDx is not transmitted to the authentication-target apparatus 103, the authentication apparatus 106 first uses the key ID10 and the authentication key Mk10. Next, the authentication apparatus 106 uses the key ID11 and the authentication key Mk11. Finally, the authentication apparatus 106 uses the key ID12 and the authentication key Mk12.

Here, the password for comparison obtained by repetitive computation that is executed m times in the authentication-target apparatus 103 is denoted as ChipPWDm'. In this case, ChipPWD1' is OFW3(Passcode1). It can be understood that Passcode1 is OFW3(OWF3(ChipPassCode)) from Formula (5). That is, the number of times of execution n in the authentication apparatus 106 is 2.

ChipPWD2' is OFW3(OFW3(Passcode2)). It can be understood that Passcode2 is OWF3(ChipPassCode) from Formula (5). That is, the number of times of execution n in the authentication apparatus 106 is 1.

ChipPWD3' is OFW3(OFW3(OFW3(Passcode3))). It can be understood that Passcode3 is ChipPassCode from Formula (5). That is, the number of times of execution n in the authentication apparatus 106 is 0.

Therefore, Passcode3 cannot be computed from Passcode2. Passcode2 cannot be computed from Passcode1. That is, Passcode3 corresponding to the authentication-target key Bk12 cannot be computed from Passcode2 corresponding to the authentication-target key Bk11. Similarly, Passcode2 corresponding to the authentication-target key Bk11 cannot be computed from Passcode1 corresponding to the authentication-target key Bk10. Therefore, as a result of using the authentication-target key Bk10 first, the security will be strengthened.

<Technical Concepts Derived from Embodiments>

[Aspect 1, 21]

An authentication apparatus 106 and an authentication-target apparatus 103 form an authentication system. The authentication apparatus 106 includes a first transmission unit (e.g.: transmitting circuit of communication circuit 202b) that transmits a passcode (code data) and a challenge (challenge data) to the authentication-target apparatus 103, and a first reception unit (e.g.: receiving circuit of communication circuit 202b) that receives a response corresponding to the challenge from the authentication-target apparatus 103. The authentication apparatus 106 includes an authentication unit (e.g.: CPU 201b) that authenticates the authentication-target apparatus 103 based on the response.

The authentication-target apparatus 103 includes a second reception unit (e.g.: receiving circuit of communication circuit 202a) that receives the passcode and the challenge from the authentication apparatus 106. A CPU 201a (recursive function computation unit 801) functions as a first generation unit that generates a password for comparison by executing repetitive computation n times by a recurrence relation or a recursive function using the passcode as an initial input. A password memory 203a and an authentication memory 204a function as a storage unit that stores a password assigned to the authentication-target apparatus 103 and a plurality of authentication seeds. The CPU 201a (comparison unit 802) functions as a password authentication unit that executes password authentication using the password stored in the storage unit and the password for comparison. The CPU 201a (response generation unit 805, seed selection unit 804) functions as a second generation unit that generates the response if the password authentication has succeeded. The CPU 201a (seed selection unit 804) reads out an authentication seed corresponding to the number n that is the number of times of execution of the repetitive computation with which the password for comparison that matches the password stored in the storage unit has been obtained. The CPU 201a (response generation unit 805) generates the response using the read-out authentication seed and the challenge received from the authentication apparatus 106. A transmitting circuit of the communication circuit 202a functions as a second transmission unit that transmits the response to the authentication apparatus 106.

In this way, as a result of executing n times of repetitive computation by a recurrence relation or a recursive function using a passcode as an initial input, the password for comparison is generated. Therefore, the authentication apparatus 106 and the authentication-target apparatus 103 each need only store at least one password. As a result, a secure authentication system can be provided while suppressing the increase in capacity of a memory.

[Aspect 2]

The number n may be an integer of 1 or more and N or less, N being an upper limit value. If a password for comparison corresponding to the number n does not match a password stored in the storage unit, the first generation unit (e.g.: CPU 201a) generates a password for comparison corresponding to a number n+1. The password authentication unit (e.g.: CPU 201a) determines whether or not the password stored in the storage unit matches the password for comparison corresponding to the number n+1.

[Aspect 3]

The password for comparison corresponding to the number n+1 may be output from the recurrence relation or recursive function as a result of inputting the password for comparison corresponding to the number n into the recurrence relation or recursive function.

[Aspect 4]

There are cases where, even if the number n is sequentially incremented from 1 to N by 1, a password for comparison that matches the password stored in the storage unit cannot be found out. In this case, the password authentication unit (e.g.: CPU 201a) may determine that the password authentication has failed. When the password authentication has failed, the second generation unit (e.g.: CPU 201a) will not generate the response. The authentication apparatus 106 cannot receive the response, and therefore, the authentication apparatus 106 recognizes that the password authentication has failed.

[Aspect 5]

An authentication memory 204b of the authentication apparatus 106 functions as a first storage unit that stores a plurality of seeds that are assigned to the authentication apparatus 106. The CPU 201b (seed selection unit 602) functions as a selection unit that selects one seed from the plurality of seeds. The CPU 201b (chip seed computation unit 603) functions as an acquisition unit that acquires identification information ID from the authentication-target apparatus 103. The CPU 201b (comparison value computation unit 604) functions as a third generation unit that generates a response for comparison using the identification information ID, one seed, and the challenge. The authentication unit (e.g.: CPU 201b, comparison unit 605) authenticates the authentication-target apparatus 103 by comparing the response for comparison with a response received from the authentication-target apparatus 103.

[Aspect 6]

The CPU 201b (passcode computation unit 600) functions as a fourth generation unit that generates the passcode such that the passcode changes according to a flag (e.g.: FLG) for managing the number of times of authentication that has been executed on the authentication-target apparatus 103.

[Aspect 7]

A first passcode to be used when the number of times of authentication managed by the flag is large may be given to a recurrence relation or a recursive function as an initial input. That is, a second passcode to be used when the number of times of authentication managed by the flag is small can be computed from the first passcode. However, the first passcode cannot be computed from the second passcode. Accordingly, another passcode is unlikely to be exposed from a passcode that is used first.

[Aspect 8, 9]

The recurrence relation or the recursive function may be a one-way function. The one-way function is a hash function, for example. The one-way function may also be a cryptographic hash function.

[Aspect 10, 22, 23]

As described in Embodiment 2, the CPU 201b (first computation unit 1301, second computation unit 1302) is an example of a first generation unit that generates a public password (e.g.: Passcode). The CPU 201b obtains derivative information by inputting a private password (e.g.: Master-PWD) stored in a private memory into a one-way function. The CPU 201b generates the public password by giving the derivative information to a recurrence relation or a recursive function as an initial input, and executing n times of repetitive computation by the recurrence relation or the recursive function. The transmitting circuit of the communication circuit 202b functions as a first transmission unit that transmits the public password to the authentication-target apparatus 103. The receiving circuit of the communication circuit 202b functions as a first reception unit that receives authentication data from the authentication-target apparatus 103. The CPU 201b functions as an authentication unit that authenticates the authentication-target apparatus 103 based on the authentication data received from the authentication-target apparatus 103.

the receiving circuit of the communication circuit 202a of the authentication-target apparatus 103 functions as a second reception unit that receives a public password from the authentication apparatus 106. The CPU 201a (repetitive computation unit 1501) functions as a first generation unit that generates a password for comparison by executing m times of repetitive computation by a recurrence relation or a recursive function using the public password as an initial input. The CPU 201a (comparison unit 1502) functions as a password authentication unit that executes password authentication using a private password assigned to the authentication-target apparatus 103 and the password for comparison. The CPU 201b (authentication computation unit 1504) functions as a second generation unit that generates authentication data, if the password authentication has succeeded. The transmitting circuit of the communication circuit 202a functions as a second transmission unit that transmits the authentication data to the authentication apparatus 106.

[Aspect 11]

The CPU 201b of the authentication apparatus 106 functions as an acquisition unit that acquires public identification information (e.g.: CRGID) from the authentication-target apparatus 103. The first generation unit (e.g.: CPU 201b) may generates the derivative information by inputting the public identification information and the private password into the one-way function.

[Aspect 12]

The acquisition unit (e.g.: CPU 201b) may be configured to further acquire k pieces of key identification information (e.g.: ID10 to ID12) for respectively identifying k private keys retained by the authentication-target apparatus 103. The private memory 1001b and the public memory 1002b of the authentication apparatus 106 function as a storage unit for storing k private master keys assigned to the authentication apparatus 106 and k pieces of key identification information for respectively identifying the k private master keys. The CPU 201b (key selection unit 1300) functions as a selection unit that selects one private master key, out of the k private master keys (e.g.: Mk10 to Mk12), that is to be used for generating authentication data for comparison. $j^{th}$ private master key (e.g.: Mk10) of the k private master keys corresponds to $j^{th}$ private key (e.g.: Bk10) of the k private keys.

[Aspect 13]

The CPU 201b (number n determination unit 1306) of the authentication apparatus 106 functions as a first determination unit that determines the number of times n based on key identification information for identifying the one private master key. The first generation unit (e.g.: second computation unit 1302) may generate the public password by executing the n times of repetitive computation by the recurrence relation or recursive function based on the number of times n determined by the first determination unit.

[Aspect 14]

The authentication unit (e.g.: key computation unit 1303) may generate key data (e.g.: Bkx') based on the one private master key and the public identification information acquired from the authentication-target apparatus 103. Moreover, the authentication computation unit 1304 may generate authentication data for comparison (e.g.: Auth (Bkx')) based on this key data. The authentication unit 1305 may authenticate the authentication-target apparatus 103 by comparing the authentication data for comparison (e.g.: Auth(Bkx')) with the authentication data (e.g.: Auth(Bkx)) received from the authentication-target apparatus 103.

[Aspect 15]

If a private password assigned to the authentication-target apparatus 103 does not match the password for comparison, the password authentication unit (e.g.: CPU 201a) may update the number m by adding 1 to the number m. The first generation unit (e.g.: CPU 201a) updates the password for comparison by executing the m times of repetitive computation by a recurrence relation or a recursive function using the public password as an initial input. The password authentication unit (e.g.: CPU 201a) may search the number m by comparing the updated password for comparison with a private password assigned to the authentication-target apparatus 103. Note that the searching processing of the number m may also be understood as searching processing of the key ID or the private key.

[Aspect 16]

The second generation unit (CPU 201a) may determine one private key corresponding to the number m, out of k private keys (e.g.: Bk10 to Bk12) retained by the authentication-target apparatus 103. The second generation unit (CPU 201a) computes the authentication data using the one private key.

[Aspect 17]

The second generation unit (CPU 201a) may determine one private key corresponding to key identification information received from the authentication apparatus 106, out of k private keys retained by the authentication-target apparatus 103. The second generation unit (CPU 201a) may compute the authentication data using the one private key. In this case, the searching processing of the key ID is not needed, and therefore the processing time of the authentication receiving processing can be reduced.

[Aspect 18]

The first transmission unit (e.g.: communication circuit 202b) may be configured to transmit key identification information for identifying the one private master key selected by the selection unit to the authentication-target apparatus 103. The CPU 201a (number m determination unit 1500) functions as a second determination unit that determines the number of times m based on the key identification information received from the authentication apparatus 106.

[Aspect 19, 20, 24, 25]

The authentication-target apparatus 103 may be mounted on a replacement part or a consumable of the image forming apparatus 100. The authentication apparatus 106 may be mounted on the image forming apparatus 100. The authentication-target apparatus 103 may also be a memory tag to be mounted on a replacement part or a consumable of the image forming apparatus. The memory tag may be an RFID tag. RFID is an abbreviation of radio frequency identifier (radio frequency identification apparatus).

The present invention is not limited to the above embodiments and various changes and modifications can be made within the spirit and scope of the present invention. Therefore, to apprise the public of the scope of the present invention, the following description is provided.

[Aspect 26]

The password memory 203a, the authentication memory 204a, and the private memory 1001a are one example of the storage unit for storing a password assigned to the authentication-target apparatus 103 and a plurality of pieces of private information (e.g.: ChipSeed, Bk). The CPU 201a functions as a search unit that searches the number of times of execution n of repetitive computation with which the password for comparison that matches a password stored in the storage unit has been obtained. The search unit (CPU 201a) generates a password for comparison by executing repetitive computation by a recurrence relation or a recursive function using the passcode as an initial input, and compares the password for comparison with a password stored in the storage unit. There are cases where the password for comparison that matches a password stored in the storage unit is found out by the search unit, and the number of times of execution n of the repetitive computation can be determined. In this case, the CPU 201a reads out private information corresponding to the number of times of execution n, out of a plurality of pieces of private information from the storage unit, and generates authentication information (e.g.: Res, Auth(Bkx)) using the read-out private information. The CPU 201a transmits the authentication information to the authentication apparatus 106.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An authentication system comprising an authentication apparatus and an authentication-target apparatus, wherein
the authentication apparatus includes:
one or more processors;
one or memories storing instructions that when executed by the one or more processors cause the one or more processors to perform operations comprising:
generating, by a first generating unit, a public password by giving derivative information obtained by inputting a first private password stored in a private memory into a one-way function, to a first recurrence relation or a first recursive function as a first initial input, and executing n times of repetitive computations by the first recurrence relation or the first recursive function;
transmitting, by a first transmitting unit, the public password to the authentication-target apparatus;
receiving, by a first receiving unit, authentication data from the authentication-target apparatus; and
authenticating the authentication-target apparatus based on the authentication data received from the authentication-target apparatus, and
the authentication-target apparatus includes:
one or more processors;
one or memories storing instructions that when executed by the one or more processors cause the authentication-target apparatus to perform operations comprising:
receiving, by a second receiving unit, the public password from the authentication apparatus;
generating, by a second generating unit, a comparison password for comparison by executing m times of repetitive computation by a second recurrence relation or a second recursive function using the public password as an initial input;
executing password authentication using a second private password assigned to the authentication-target apparatus and the comparison password;
generating, by a third generating unit, authentication data if the password authentication has succeeded; and
transmitting, by a second transmitting unit, the authentication data to the authentication apparatus.

2. The authentication system according to claim 1, wherein the operations performed by the authentication apparatus further includes:
acquiring public identification information from the authentication-target apparatus, and
obtaining the derivative information by inputting the public identification information and the first private password into the one-way function.

3. The authentication system according to claim 2, wherein
the acquiring further acquires k pieces of key identification information for respectively identifying k private keys retained by the authentication-target apparatus, and
the authentication apparatus further includes:
a storage configured to store k private master keys assigned to the authentication apparatus and k pieces of key identification information for respectively identifying the k private master keys; and
the operations performed by the authentication apparatus further includes:
selecting one private master key to be used for generating authentication data for comparison, from the k private master keys,
wherein a $j^{th}$ private master key of the k private master keys corresponds to a $j^{th}$ private key of the k private keys.

4. The authentication system according to claim 3, wherein
the operations performed by the authentication apparatus further include:
determining, by a first determining unit, the number of times n based on key identification information for identifying the one private master key, and
generating the public password by executing the n times of repetitive computation by the recurrence relation or the recursive function based on the number of times n determined by the first determining unit.

5. The authentication system according to claim 4, wherein
the authenticating performed by the authentication apparatus further comprises:
generating key data based on the one private master key and the public identification information acquired from the authentication-target apparatus,
generating authentication data for comparison based on the key data, and
authenticating the authentication-target apparatus by comparing the authentication data for comparison with the authentication data received from the authentication-target apparatus.

6. The authentication system according to claim 1, wherein
If the second private password assigned to the authentication-target apparatus does not match the comparison password, the following operations are performed:

the authentication-target apparatus executes updating of the number m by adding 1 to the number m, the authentication apparatus executes updating of the comparison password by executing the m times of repetitive computation by the first recurrence relation or the first recursive function using the public password as a second initial input, and the authentication-target apparatus executes searching the number m by comparing the updated comparison password with the second private password assigned to the authentication-target apparatus.

7. The authentication system according to claim 6, wherein the authentication-target apparatus further executes, in connection with the second generating, determining one private key corresponding to the number m, out of k private keys retained by the authentication-target apparatus, and computing the authentication data using the one private key.

8. The authentication system according to claim 3, wherein the authentication-target apparatus further executes, in connection with the second generating, determining one private key corresponding to key identification information received from the authentication apparatus, out of k private keys retained by the authentication-target apparatus, and computing the authentication data using the one private key.

9. The authentication system according to claim 8, wherein the first transmitting transmits key identification information for identifying the selected one private master key to the authentication-target apparatus, and the operations performed by the authentication-target apparatus further include:

determining, by a second determining unit, the number of times m based on the key identification information received from the authentication apparatus.

10. The authentication system according to claim 1, wherein the authentication-target apparatus is mounted on a replacement part or a consumable of an image forming apparatus, and the authentication apparatus is mounted on the image forming apparatus.

11. The authentication system according to claim 10, wherein the authentication-target apparatus is a memory tag to be mounted on the replacement part or the consumable of the image forming apparatus.

12. An authentication apparatus comprising:

one or more processors;

one or memories storing instructions that when executed by the one or more processors cause the authentication apparatus to perform:

generating a public password by giving derivative information obtained by inputting a private password stored in a private memory into a one-way function, to a recurrence relation or a recursive function as an initial input, and executing n times of repetitive computation by the recurrence relation or the recursive function;

transmitting the public password to an authentication-target apparatus;

receiving authentication data from the authentication-target apparatus; and authenticating the authentication-target apparatus based on the authentication data received from the authentication-target apparatus.

13. An image forming apparatus comprising:

one or more processors;

one or memories storing instructions that when executed by the one or more processors cause the image forming apparatus to perform:

generating a public password by giving derivative information obtained by inputting a private password stored in a private memory into a one-way function, to a recurrence relation or a recursive function as an initial input, and executing n times of repetitive computation by the recurrence relation or the recursive function;

transmitting the public password to an authentication-target apparatus;

receiving authentication data from the authentication-target apparatus; and authenticating the authentication-target apparatus based on the authentication data received from the authentication-target apparatus.

* * * * *